United States Patent
Lim et al.

(10) Patent No.: US 12,451,247 B2
(45) Date of Patent: Oct. 21, 2025

(54) USER INTERFACE FOR MANAGING A MULTIPLE DIAGNOSTIC ENGINE ENVIRONMENT

(71) Applicant: Siemens Healthcare Diagnostics Inc., Tarrytown, NY (US)

(72) Inventors: Karen Lim, Brighton, MA (US); Prabhu Ramachandran, Newton, MA (US)

(73) Assignee: Siemens Healthcare Diagnostics Inc., Tarrytown, NY (US)

( * ) Notice: Subject to any disclaimer, the term of this patent is extended or adjusted under 35 U.S.C. 154(b) by 888 days.

(21) Appl. No.: 16/764,092

(22) PCT Filed: Nov. 16, 2018

(86) PCT No.: PCT/US2018/061551
§ 371 (c)(1),
(2) Date: May 14, 2020

(87) PCT Pub. No.: WO2019/099851
PCT Pub. Date: May 23, 2019

(65) Prior Publication Data
US 2020/0286621 A1 Sep. 10, 2020

Related U.S. Application Data

(60) Provisional application No. 62/588,697, filed on Nov. 20, 2017.

(51) Int. Cl.
*G16H 50/20* (2018.01)
*G16H 10/60* (2018.01)
(Continued)

(52) U.S. Cl.
CPC ............. *G16H 50/20* (2018.01); *G16H 10/60* (2018.01); *G16H 40/20* (2018.01); *G16H 50/30* (2018.01); *G16H 50/70* (2018.01)

(58) Field of Classification Search
CPC ........ G16H 50/20; G16H 40/20; G16H 10/60; G16H 50/30
See application file for complete search history.

(56) References Cited

U.S. PATENT DOCUMENTS

| | | |
|---|---|---|
| 5,807,256 A | 9/1998 | Taguchi et al. |
| 5,812,419 A | 9/1998 | Chupp et al. |

(Continued)

FOREIGN PATENT DOCUMENTS

| | | |
|---|---|---|
| CN | 101444419 A | 6/2009 |
| CN | 101556629 A | 10/2009 |

(Continued)

OTHER PUBLICATIONS

International Search Report and Written Opinion of International Application No. PCT/US2018/061551 dated Jan. 16, 2019.

(Continued)

*Primary Examiner* — Peter H Choi
*Assistant Examiner* — Aaisha Abdullah

(57) ABSTRACT

A point of care system may comprise a plurality of diagnostic engines and an IDM in electronic communication with each of the plurality of diagnostic engines. Each of the plurality of diagnostic engines may perform testing on a sample inserted into the diagnostic engine. The IDM may be configured to communicate with each of the plurality of diagnostic engines to enable a plurality of tests to be performed on multiple different samples substantially simultaneously by a plurality of users using the plurality of diagnostic engines and to present a single user interface for managing testing by the plurality of diagnostic engines and for receiving the results of tests performed by each of the plurality of diagnostic engines.

20 Claims, 23 Drawing Sheets

(51) Int. Cl.
    *G16H 40/20*      (2018.01)
    *G16H 50/30*      (2018.01)
    *G16H 50/70*      (2018.01)

(56) References Cited

U.S. PATENT DOCUMENTS

| | | | |
|---|---|---|---|
| 6,055,487 A * | 4/2000 | Margery | G01N 35/00871 |
| | | | 702/22 |
| 6,581,012 B1 * | 6/2003 | Aryev | G05B 19/41865 |
| | | | 702/22 |
| 7,509,232 B2 | 3/2009 | Seher et al. | |
| 8,041,463 B2 | 10/2011 | Pollack et al. | |
| 8,894,946 B2 | 11/2014 | Nielsen et al. | |
| 9,259,734 B2 | 2/2016 | Williams et al. | |
| 9,285,366 B2 | 3/2016 | Burd et al. | |
| 9,417,210 B2 | 8/2016 | Arlen et al. | |
| 9,418,493 B1 | 8/2016 | Dong | |
| 9,458,488 B2 | 10/2016 | Johnson et al. | |
| 10,607,724 B2 * | 3/2020 | Miyauchi | G16H 40/67 |
| 2006/0259265 A1 * | 11/2006 | Mishima | G16H 15/00 |
| | | | 702/118 |
| 2007/0038406 A1 * | 2/2007 | Uemura | G16Z 99/00 |
| | | | 705/2 |
| 2007/0124099 A1 * | 5/2007 | Onomichi | G01N 35/00594 |
| | | | 702/127 |
| 2007/0254277 A1 | 11/2007 | Scrabeck et al. | |
| 2008/0103814 A1 | 5/2008 | Fabius et al. | |
| 2008/0250477 A1 | 10/2008 | Samuelsson et al. | |
| 2008/0312893 A1 | 12/2008 | Denton | |
| 2009/0163832 A1 | 6/2009 | Sunderani | |
| 2010/0212675 A1 | 8/2010 | Walling et al. | |
| 2010/0292618 A1 | 11/2010 | Okuya et al. | |
| 2011/0020785 A1 | 1/2011 | Lowery, Jr. et al. | |
| 2011/0245061 A1 | 10/2011 | Haechler | |
| 2011/0245089 A1 | 10/2011 | Scott et al. | |
| 2012/0029303 A1 | 2/2012 | Shaya | |
| 2012/0042214 A1 | 2/2012 | Jacobs et al. | |
| 2012/0046203 A1 | 2/2012 | Walsh et al. | |
| 2013/0260414 A1 * | 10/2013 | Yao | G01N 35/00712 |
| | | | 436/63 |
| 2014/0058755 A1 | 2/2014 | Macoviak et al. | |
| 2014/0075032 A1 | 3/2014 | Vasudevan et al. | |
| 2014/0100811 A1 | 4/2014 | Fuchs et al. | |
| 2014/0194305 A1 | 7/2014 | Kayyem et al. | |
| 2014/0251836 A1 | 9/2014 | Feeney | |
| 2014/0316813 A1 | 10/2014 | Bauer | |
| 2015/0127270 A1 * | 5/2015 | Goemann-Thoss | G01N 33/48 |
| | | | 702/31 |
| 2015/0212104 A1 | 7/2015 | Furrer et al. | |
| 2015/0268186 A1 | 9/2015 | Pagels | |
| 2015/0338427 A1 * | 11/2015 | Pollack | G01N 35/0095 |
| | | | 422/67 |
| 2016/0020986 A1 | 1/2016 | Bosko et al. | |
| 2016/0025639 A1 | 1/2016 | Jakubowicz | |
| 2016/0054307 A1 | 2/2016 | Pinkowitz et al. | |
| 2016/0314254 A1 | 10/2016 | Nakamura et al. | |
| 2016/0321421 A1 | 11/2016 | Delgrande et al. | |
| 2017/0049964 A1 * | 2/2017 | Varsavsky | G16H 50/20 |
| 2017/0067922 A1 * | 3/2017 | Antoni | G01N 35/1072 |
| 2017/0076054 A1 | 3/2017 | Tindel et al. | |
| 2017/0177724 A1 | 6/2017 | Booker et al. | |
| 2018/0046871 A1 * | 2/2018 | Ionita | G06V 40/172 |

FOREIGN PATENT DOCUMENTS

| | | | |
|---|---|---|---|
| CN | 102264294 A | 11/2011 | |
| CN | 102651995 A | 8/2012 | |
| CN | 105122254 A | 12/2015 | |
| CN | 106126958 A | 11/2016 | |
| CN | 106548039 A | 3/2017 | |
| DE | 202009018545 U1 | 3/2012 | |
| DK | 0483595 T3 | 4/2002 | |
| JP | 2002329004 A | 11/2002 | |
| JP | 2003202346 A | 7/2003 | |
| JP | 2004201886 A | 7/2004 | |
| JP | 2009104674 A | 5/2009 | |
| JP | 2010263953 A | 11/2010 | |
| JP | 2011096235 A | 5/2011 | |
| JP | 2011186862 A | 9/2011 | |
| JP | 2012052850 A | 3/2012 | |
| JP | 2013077335 A | 4/2013 | |
| JP | 2013541079 A | 11/2013 | |
| JP | 2015170187 A | 9/2015 | |
| JP | 2015201003 A | 11/2015 | |
| JP | 2016109697 A | 6/2016 | |
| JP | 2017018573 A | 1/2017 | |
| WO | 03048998 A2 | 6/2003 | |
| WO | 2008097793 A1 | 8/2008 | |
| WO | 2011072860 A1 | 6/2011 | |
| WO | 2015143309 A1 | 9/2015 | |
| WO | 2015187480 A1 | 10/2015 | |
| WO | 2016127089 A1 | 8/2016 | |
| WO | 2016188738 A1 | 12/2016 | |
| WO | 2017190029 A1 | 11/2017 | |

OTHER PUBLICATIONS

European Search Report and Search Opinion of European Application No. 18879008.3 dated Dec. 21, 2020.
Radiometer ABL80 Flex Brochure, 2009, pp. 1-10.
Apple et al., "Clinical Evaluation of the First Medical Whole Blood, Point-of-Care Testing Device for Detection of Myocardial Infarction", 2000, Clinical Chemistry 46, No. 10, pp. 1604-1609.
Abbot Point of Care "i-STAT® 1 System Manual", Mar. 7, 2013, pp. 1-606.
Abbott "i-STAT® Cartridge Menu Brochure", Oct. 2016, p. 1.
"i-STAT Handheld", 045714, Rev B, Dec. 2016, pp. 1-10.
"Samsung Labgeo PT10," Samsung, 2015, pp. 1-4.
You et al., "Point-of-Care Test Equipment for Flexible Laboratory Automation", 2014, SAGE Journal of Laboratory Automation, vol. 19(4), pp. 403-412.
Bao Chen et al:"HLSVD versus AMARES for magnetic resonance spectroscopy data quantification", Journal of Clinical Rehabilitative Tissue Engineering Research Jan. 22, 2011 vol. 15, No. 4, ISSN 1673-8225, pp. 683-686, Jan. 22, 201; see English Abstract.
Chu Yang et al:"Detection of helium leakage from Siemens Impact 1. 0T superconducting MR", Nov. 10, 1996.
Ewels et al; "MultiQC: summarize analysis results for multiple tools and samples in a single report" Oct. 2016, Bioinformatics, vol. 32, Issue 19, pp. 3047-3048.

* cited by examiner

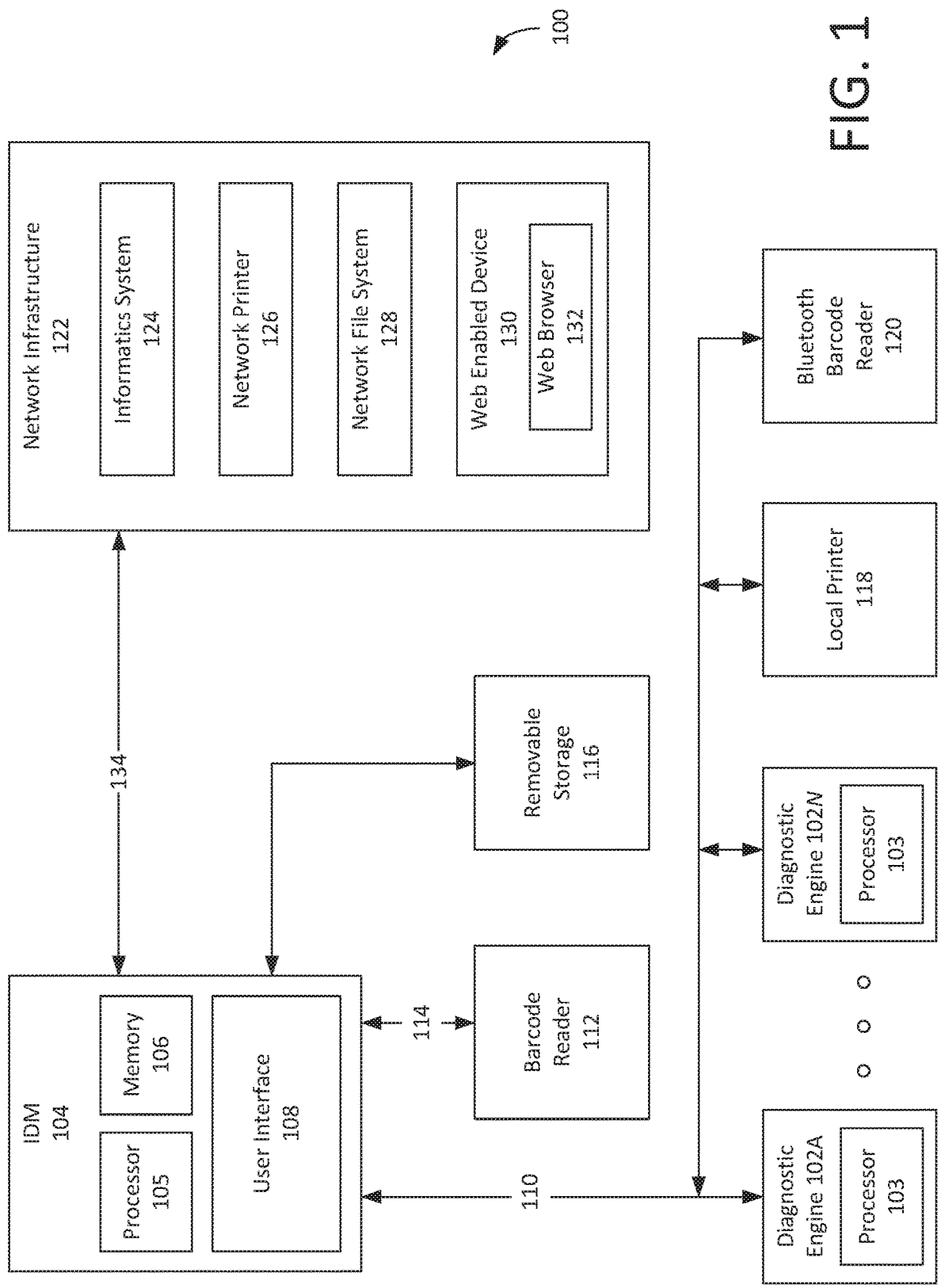

FIG. 4C

Analyzer 1
4:21 PM 10/20/2018
John Smith
OID123

↓ Sample Instruction

Please insert an
HbA1c cartridge

FIG. 4D

Analyzer 1
4:21 PM 10/20/2018
John Smith
OID123

↓ Patient Information

Patient ID
PID111

Last Name
Jackson

First Name
David

Gender
Male

Date of Birth
January 21, 1965

Recent Patients    Patient List

Cancel    OK

FIG. 4G

4:21 PM 10/20/2018 | Analyzer 2

John Smith
OID123

↓ Patient Information

Patient ID
PID222

Last Name
Anderson

First Name
Juanita

Gender
Female

Date of Birth
August 28, 1979

Recent Patients | Patient List

Cancel | OK

John Smith
OID123

Analyzer 1
1:44 Remaining

Analyzer 2
2:22 Remaining

Analyzer 3
Start

4:21 PM 10/20/2018   Analyzer 3

John Smith
OID123

→ Patient Information

Patient ID
PID333

Last Name
Simpson

First Name
Danika

Gender
Female

Date of Birth
August 19, 1959

Recent Patients    Patient List

Cancel    OK

FIG. 4J

4:21 PM 10/20/2018   Analyzer 3

John Smith
OID123

→ Sample Instruction

Please insert an HbA1c cartridge

4:21 PM 10/20/2018 — Analyzer 1

John Smith
OID123

Test Result ⊕

Operator ID: OID123
Patient ID: PID111

HbA1c = 5.6%

Patient ID
September 23, 2018 at 12:30 PM

Engine ID
Analyzer 1
Last Name
Jackson
First Name
David

[Comment]  [Print]  [Transmit]

John Smith
OID123

Analyzer 1
Complete

Analyzer 2
Complete

Analyzer 3
0:15 Remaining

FIG. 4P

Analyzer 2
4:21 PM 10/20/2018
John Smith
OID123

→ Sample Instruction

Please remove
HbA1c cartridge

FIG. 4O

Analyzer 2
4:21 PM 10/20/2018
John Smith
OID123

→ Test Result

Operator ID: OID123
Patient ID: PID222
HbA1c = 4.3%
Patient ID
September 23, 2018 at 12:30 PM
Engine ID
Analyzer 2
Last Name
Anderson
First Name
Juanita

| Comment | Print | Transmit |

4:21 PM 10/20/2018 | Analyzer 3

John Smith
OID123

Test Result

Operator ID: OID123
Patient ID: PID333

HbA1c = 6.9%

Patient ID
September 23, 2018 at 12:30 PM

Engine ID
Analyzer 3
Last Name
Simpson
First Name
Danika

Comment | Print | Transmit

John Smith
OID123

Analyzer 1
Start

Analyzer 2
Complete

Analyzer 3
Complete

4:21 PM 10/20/2018

Scan or Enter Operator ID

Operator Login

Operator ID
OID123456789

Password
***********

Scan

Scan or Enter Operator ID

Clinical 1
Start

Clinical 2
Start

Urine Analyzer
Start

4:21 PM 10/20/2018 — Clinical 1
OID123456789

↓ Patient Information

Patient ID
PID123456789

Last Name
Smith

First Name
John

Gender
Male

Date of Birth
October 30, 1960

Scan | Recent Patients | Patient List

Cancel | OK

FIG. 5C

4:21 PM 10/20/2018 — Clinical 1
OID123456789

↓ Instruction

Please insert a sample cartridge

FIG. 5J

4:21 PM 10/20/2018 — Clinical 2

OID987654321

↓ Patient Information

Patient ID
PID987654321

Last Name
Anderson

First Name
Susan

Gender
Female

Date of Birth
July 18, 1972

[Scan] [Recent Patients] [Patient List]

[Cancel] [OK]

FIG. 5I

4:21 PM 10/20/2018 — Clinical 2

OID987654321

↓ Instruction

Please insert a sample cartridge

OID987654321     4:21 PM 10/20/2018     Clinical 2

Test Result

Operator ID
OID987654321

Patient ID
PID987654321

HbA1c = 5.6%

Engine ID
Analyzer 3

Last Name
Simpson

First Name
Danika

Comment     Print     Transmit

OID987654321     4:21 PM 10/20/2018

Clinical 1
Complete

Clinical 2
Complete

Urine Analyzer
Start

FIG. 5K

USER INTERFACE FOR MANAGING A MULTIPLE DIAGNOSTIC ENGINE ENVIRONMENT

The subject application claims benefit under 35 USC § 119(e) of U.S. provisional Application No. 62/588,697, filed Nov. 20, 2017. The entire contents of the above-referenced patent application are hereby expressly incorporated herein by reference.

BACKGROUND

Point of care testing may be defined as medical diagnostic testing that is performed at a location where care or other treatment is provided. Point of care testing may also be referred to as near-patient testing, remote testing, satellite testing, and rapid diagnostics testing. Point of care test results may be made available relatively quickly so that they can be acted upon without delay. This increases the likelihood that the patient, physician, and care team will receive the results quicker, which allows for better and more immediate clinical management decisions to be made.

SUMMARY

Disclosed herein are methods and systems for analyzing one or more samples. A point of care system may comprise a plurality of diagnostic engines and an instrument data manager (IDM) in electronic communication with each of the diagnostic engines. Each of the diagnostic engines may perform testing on a sample. The IDM may be configured to communicate with each of the plurality of diagnostic engines to enable a plurality of tests to be performed on multiple different samples substantially simultaneously by a plurality of users using the plurality of diagnostic engines and to present a single user interface for managing testing by the plurality of diagnostic engines and for receiving measured results of tests performed by each of the plurality of diagnostic engines.

The plurality of diagnostic engines may for example comprise at least one of a blood gas diagnostic engine, a cardiac diagnostic engine, a coagulation diagnostic engine, a diabetes diagnostic engine, and a urinalysis diagnostic engine, and one or more of the plurality of diagnostic engines may be different types of diagnostic engines. The one or more diagnostic engines may perform a test and may store (e.g., buffer) a measured result of that test for a limited period until the measured result is received by the IDM or until an application running on the diagnostic engine shuts down. The user interface may display one or more icons each representing a given one of the diagnostic engines associated with the IDM.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings:

FIG. 1 shows an example system diagram according to an aspect of the disclosure;

FIG. 4C shows an example prompt displayed by the user interface;

FIG. 4D shows an example patient information page of the user interface;

FIG. 4G shows an example patient information page of the user interface;

FIG. 4H shows example icons presented by a user interface for representing the plurality of diagnostic engines;

FIG. 4I shows an example prompt displayed by the user interface;

FIG. 4J shows an example patient information page of the user interface;

FIG. 4K shows example icons presented by a user interface for representing the plurality of diagnostic engines;

FIG. 4L shows example calculated results presented by the user interface;

FIG. 4O shows example calculated results presented by the user interface;

FIG. 4P shows an example prompt displayed by the user interface;

FIG. 4Q shows example icons presented by a user interface for representing the plurality of diagnostic engines;

FIG. 4R shows example calculated results presented by the user interface;

FIG. 5A shows example icons presented by a user interface for representing a plurality of diagnostic engines;

FIG. 5B shows an example operator login page of the user interface;

FIG. 5C shows an example prompt displayed by the user interface;

FIG. 5D shows an example patient information page of the user interface;

FIG. 5I shows an example prompt displayed by the user interface;

FIG. 5J shows an example patient information page of the user interface;

FIG. 5K shows example icons presented by a user interface for representing the plurality of diagnostic engines;

FIG. 5L shows example calculated results presented by the user interface;

FIG. 5O shows example icons presented by a user interface for representing the plurality of diagnostic engines.

DETAILED DESCRIPTION OF ILLUSTRATIVE EMBODIMENTS

Figure 1A:
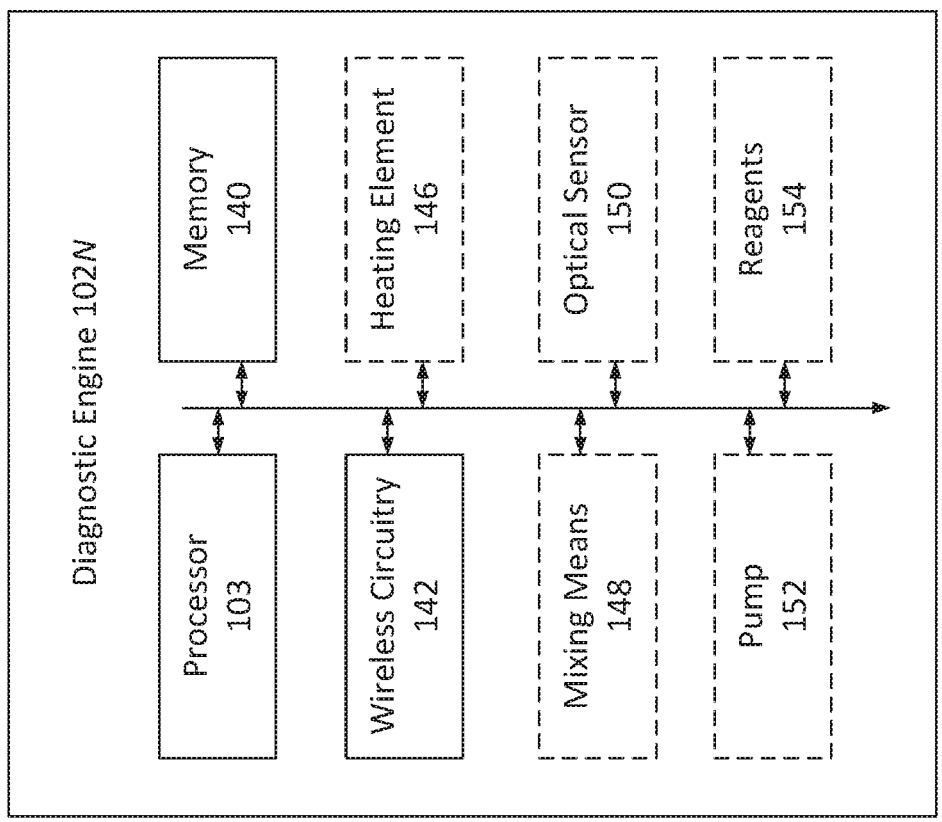
FIG. 1A shows an example diagnostic engine.

Point of care testing may be defined as medical diagnostic testing that is performed at a location where care or other treatment is provided. A point of care system or device may be located, for example, in a hospital, nursing home, clinic, or in the home of an individual patient. Point of care testing may also be referred to herein as near-patient testing, remote testing, satellite testing, and rapid diagnostics testing.

Point of care systems typically comprise a single diagnostic engine, a processor, and a user interface for viewing the results generated by the diagnostic engine. For example, a point of care system for diabetes testing may comprise a single diagnostic engine for receiving a blood sample, a processor that is configured to process a single blood sample test at a time, and a user interface for displaying the results of the test on that sample. In certain prior art systems, the user interface and the diagnostic engine are located within the same housing. Because the user interface is typically attached to the diagnostic engine, only one test may usually be performed at one time, by a single user, using the single diagnostic engine. Even in an example where the user interface is capable of being paired with more than one diagnostic engine, the user interface may not allow multiple tests to be controlled simultaneously, let alone allowing multiple different kinds of tests to be performed by a multitude of different users.

In point of care locations where multiple operators are performing tests on multiple patients, it may be necessary to have numerous point of care systems each having their own user interface. For example, a first user (e.g., a nurse or lab technician) may insert a blood sample into a diabetes diagnostic engine while a second user may insert a urine sample into a urinalysis diagnostic engine. The first user may receive results from a first user interface associated with the diabetes diagnostic engine while the second user may receive results from a second user interface associated with the urinalysis diagnostic engine. The multiple user interfaces may result in unnecessary costs to the testing facility and may take up unnecessary space in the testing facility. Additionally, if an upgrade were to be made to a given one of the diagnostic engines, it would be necessary to purchase a completely new point of care system, including a new diagnostic engine, a new processor and a new user interface. The same would be true if only a single component of the point of care system were to break or otherwise need replacement. Thus, numerous disadvantages are apparent from a technical standpoint in a point of care system where each of each of the components of the point of care system are located in a single enclosure.

Disclosed herein is a point of care system comprising a plurality of diagnostic engines and an instrument data manager (IDM) in electronic communication with each of the plurality of diagnostic engines. Each of the plurality of diagnostic engines may perform testing on a sample. The IDM may be configured to communicate with each of the plurality of diagnostic engines to enable a plurality of tests to be performed on multiple different samples substantially simultaneously by a plurality of users using the plurality of diagnostic engines and to present a single user interface for managing testing by the plurality of diagnostic engines and for receiving measured results of tests performed by each of the plurality of diagnostic engines. Methods for interacting with the point of care system and the user interface are also disclosed.

The disclosed point of care system may include an IDM and a user interface that may be paired with any number of diagnostic engines. When improvements are made to a diagnostic engine, it may be possible to pair the newest diagnostic engine with the existing user interface. In addition, it may be possible to pair the IDM with multiple different types of diagnostic engines and to allow multiple operators to run tests simultaneously on the different types of diagnostic engines. This may allow users of the point of care system to customize the number and types of diagnostic engines to fit their specific needs. Further, since the IDM and the user interface may manage a plurality of diagnostic engines in a testing facility, it may be possible that the diagnostic engines themselves may have limited processing capabilities and little or no display capabilities.

The diagnostic engines disclosed herein may perform one or measurements on a sample in real-time. It is understood that the term "real-time" as used herein is intended to mean that the measurements must be obtained at a particular time and/or based on the occurrence of a particular event. In an example where the measurements must be obtained at a particular time, during testing of a blood sample by the diagnostic engine, data must be obtained at specific time points (e.g., exactly ten seconds after the test on the sample is initiated) in order for an accurate result to be calculated. In an example where the measurements must be obtained based on a particular event, heating of a sample may be initiated and an instruction may comprise collecting one or more measurements of the sample when the temperature of the sample reaches 100 degrees. When, how and why data needs to be obtained is dependent on the design of individual diagnostic engines. The diagnostic engines may additionally determine one or measured results based on the measurements. The measured results may be determined either in real-time or in non-real time. It is understood that the term "non-real time" as used herein is indented to mean that the result does not need to be performed at a particular time or within a particular time interval in order to be considered valid. The measured results may represent a result of a test on a sample and may be based one or more of the real-time measurements performed at the diagnostic engine. The measured results may be sent by the one or more diagnostic engines to the IDM for further processing and/or displaying on a user interface. The one or more measurements may additionally or alternatively be sent to the IDM. For example, a diagnostic engine may send to the IDM only the measured results, only the collected measurements, or a combination of the measurements and measured results.

The IDM may receive the measured result from the one or more diagnostic engines and may generate a calculated result. The calculated result may be determined based on the measured result and one or more parameters. The one or more parameters may be parameters stored at the IDM, parameters received from a user via the interface of the IDM, and/or parameters received from the diagnostic engines. Example parameters may include but are not limited to demographic information associated the patient and a time of day at which the measured result was determined. Generating the calculated results may comprise performing a unit conversion (e.g., from Celsius to Fahrenheit) or computing a ratio of one measured result to another. The calculated results may be determined at the IDM in non-real time. It is understood that the IDM does not alter the measured results themselves, and instead generates new calculated results based on the measured results and possibly other parameters received at the IDM. It is further understood that no patient information may be sent from the diagnostic engines to the IDM in order to ensure the security of the patient information.

The IDM may receive patient information and may link the patient information with the measured results and/or the calculated results. It is understood that the diagnostic engines themselves may not receive any patient information. Regulatory standards may require that diagnostic engines not receive any information associated with the patient. Instead, this information may be received and stored at the IDM. The IDM may comprise a user interface for displaying the measured results received from the diagnostic engines and/or the calculated results determined at the IDM.

In an example, a diabetes diagnostic engine may test a blood sample to determine one or more measurements indicative of an Albumin level and/or a creatinine level of the blood sample. The diagnostic engine may have a real-time processor, and thus the measurements may be determined in real-time. A measured result may be generated by the diagnostic engine (in real-time or in non-real time) that represents a result of the test on the sample, such as the Albumin level and the creatinine level of the blood sample. The diagnostic engine may send the measured results to the IDM in real time or in non-real time. The IDM may generate a calculated result based on one or more of the measured results and parameters received at the IDM (e.g., using the user interface associated with the IDM). Using the example above, the IDM may generate a calculated result by computing a ratio of the Albumin level to the creatinine level in the blood sample. The IDM may perform other operations including but not limited to unit conversions.

The diagnostic engine processing may be limited to performance of a test on a sample, computation of one or more measured results, and storage of the measured result until communicated to the IDM. Higher-level processing of the measured results may be performed by the IDM. For example, the IDM may generate calculated results from the measured results which are generated by the diagnostic engines and the parameters which are provided by a user (e.g., through the user interface). Limiting the processing necessities of the diagnostic engines themselves and generating and displaying calculated results at the IDM may allow for improvements to be made to the diagnostic engines without the need for bulky processors and user interfaces. Since the user interface at the IDM is diagnostic engine agnostic, diagnostic engines may be purchased at a later time and may be upgraded without the need to upgrade the user interface or their world interfaces.

FIG. 1 shows a point of care system 100 in accordance with an aspect of the disclosure. The system 100 may comprise one or more diagnostic engines 102A through 102N, an instrument data manager (IDM) 104, a user interface 108, and a network infrastructure 122. The user interface 108 may be a part of the IDM 104. The system may optionally comprise one or more of a bar code reader 112, removable storage 116, a local printer 118, and a Bluetooth barcode reader 120.

The diagnostic engines 102 may perform one or more tests. The diagnostic engine 102 may perform one or more tests to determine one or more characteristics of a sample, such as a bodily fluid sample. For example, the diagnostic engine 102 may be a diabetes diagnostic engine configured to determine one or more characteristics of a blood sample, such as an HbA1c level associated with the blood sample, or may be a urinalysis diagnostic engine configured to determine one or more characteristics of a urine sample, such as the presence of one or more metabolites in that urine sample.

A diagnostic engine 102 may contain not only the physical components of the diagnostic engine 102 (e.g., heating element 146, mixing means 148, optical scanners 150, pumps 152, reagents 154, consumables, etc.), but may also control the series of steps in which use of those components are utilized to obtain a measured result. The diagnostic engine 102 may For example, a diabetes diagnostic engine may mix a sample using the mixing means 148, heat the sample to 80 degrees C. using the heating element 146, mix the sample a second time using the mixing means 148, and take an optical reading of the sample using the optical scanner 150.

The diagnostic engine 102 may be configured to directly or indirectly receive a sample. A diagnostic engine configured to directly receive a sample may be responsible for handling that sample itself, coming into direct contact with the sample during the test. Examples of these types of diagnostic engines include so called "bench top" blood gas analyzers (such as the RapidPoint 500, sold by Siemens Healthcare Diagnostics Inc.) and automated urine chemistry analyzers (such as the Clinitek Novus, sold by Siemens Healthcare Diagnostics Inc.).

Alternatively, the diagnostic engine, and physical components thereof, may not come into contact with the sample directly, but rather indirectly. Illustrative diagnostic engines of this type may receive a consumable that contains the sample, not the sample directly. A consumable may refer to any physical structure which can contain the sample. Examples of consumables include urine strips, cartridges, and lateral flow strips.

The diagnostic engine 102 may be a virtual diagnostic engine. A virtual diagnostic engine may utilize one or more features of the point of care system, such as a camera associated with the point of care system, to interface with a test sample. A virtual diagnostic engine may non-invasively determine one or more measured results from a patient, such as determining a patient's blood pressure or pulse (e.g., using a blood pressure cuff or pulse monitor). A virtual diagnostic engine may determine other information such as ambient temperature, humidity, or may present a questionnaire that allows patient information to be entered. It is understood that the term "sample" as used herein is intended to include measured results from a virtual diagnostic engine.

The sample may be obtained from a patient using any one or a combination of methods known in the art. For example, in order to obtain a blood sample, a syringe can be used to withdraw blood from a vein of the patient. Additionally or alternatively, the blood sample can be separated (e.g., by centrifugation) to isolate and obtain a serum sample. A blood sample can additionally or optionally be obtained by lightly pricking one of the subject's fingers (e.g., with a sterile needle) and then collecting a desired volume of blood.

Following collection of the sample, the sample may be placed in a sample container or onto a consumable configured to be received by a given one of the diagnostic engines 102. For example, the sample container may be a plastic or glass container configured to receive a certain volume of the sample, or may be a test strip configured to receive a minor amount of the sample. It is understood that the sample container may comprise any type of container configured to receive any volume of a sample capable of being inserted into the diagnostic engine 102.

Bodily fluids capable of being tested by the diagnostic engines 102 include but are not limited to urine, blood, plasma, saliva, cerebrospinal fluid, pleural fluid, nasopharyngeal, and the like. Blood samples may be routinely analyzed to obtain measurements of the partial pressures of CO2 and O2 and concentrations of electrolytes and metabolites in the blood. A number of different diagnostic engines may be provided for making such measurements utilizing rigid layered sensor assemblies and electrical circuits. Such sensor assemblies may be used to assess the condition of medical patients through primary clinical indications, for example, through monitoring of pCO2, pO2, pH, Na+, K+, Ca2+, cl−, glucose, lactate, and hemoglobin values. However, it is understood that the samples are not limited to these types of samples and that the diagnostic engine 102 may be configured to process any types of samples.

The diagnostic engine 102 may include a chemical sensor. The diagnostic engine 102 may comprise a chemical surface, an integrated circuit structure, a micro-electromechanical structure, an optical sensor, or another device responsive to chemical characteristics, such as a chemical type, blood gas level, pH level, existence of a particular chemical, amount of a particular chemical, or other characteristics. For example, the diagnostic engine 102 may comprise a chemical or biological recognition element with or without a permeable membrane and a signal transducer element, such as electrochemical (amperometry or potentiometry), electrical (ion-sensitive field effect transistor, conductance, impedance, potential, or current), optical (luminescence, fluorescence or refractive index), thermal and/or piezoelectric elements. An amplification or processing element may be integrated with the analyte responsive recognition element and/or the signal transducer element. Using membrane entrapment, physical adsorption, matrix entrapment, reaction chamber, covalent bonding, or another physical structure for exposure, a biological recognition phase (enzyme, antibody, receptor, DNA or other chemical) may interact with the analyte of interest to produce a charge or optical change at the sensor-transducer interface or electrode. Any now known or later developed chemical sensors, such as immunosensors, optrodes, chemical canaries, resonant mirrors, glucometers, biochips, and/or biocomputers, may be used.

The system 100 may comprise multiple diagnostic engines 102 and/or multiple different types of diagnostic engines 102. For example, the system 100 may comprise a first diagnostic engine 102A configured for testing a first type of sample (e.g., a blood sample) and a second diagnostic engine 102B configured for testing a second type of sample (e.g., a urine sample). The system 100 may comprise any number of diagnostic engines 102 for testing any number of different types and combinations of samples. Example diagnostic engines 102 include but are not limited to blood gas diagnostic engines, cardiac diagnostic engines, coagulation diagnostic engines, diabetes diagnostic engines, urinalysis diagnostic engines, and blood pressure diagnostic engines.

A blood gas diagnostic engine may be configured to receive a blood sample and to determine one or more characteristics of that blood sample. For example, a blood gas diagnostic engine may be configured to measure one or more of hydrogen ions (pH), partial pressure of carbon dioxide (pCO$_2$) and partial pressure of oxygen (pO$_2$) in a blood sample. The blood gas diagnostic engine may also be configured to measure for the presence and/or concentration of electrolytes and metabolites in the blood sample.

A cardiac diagnostic engine may be configured to receive a sample and measure one or more cardiac health markers. In one embodiment, the cardiac diagnostic engine may receive a blood sample and may be configured to measure one or more of total cholesterol, low-density lipoprotein (LDL) cholesterol, high-density lipoprotein (HDL) cholesterol, triglycerides, non-HDL cholesterol, and high-sensitivity C-reactive protein in the blood sample. In addition, the cardiac diagnostic engine may be configured to test for and/or measure troponin levels in the blood sample.

A coagulation diagnostic engine may be configured to receive a blood sample and to measure one or more blood clotting characteristics. The coagulation diagnostic engine may perform one or more of the following tests: Prothrombin time (PT), Activated Partial Thromboplastin Time (APTT), and Activated Clotting Time (ACT). The coagulation diagnostic engine may apply a chemical membrane to one or more electrodes in a reaction chamber which may create thrombin in the blood sample. An activator may also be present to accelerate the creation of thrombin in the sample.

A diabetes diagnostic engine may be configured to measure one or more diabetes markers in a sample. In one embodiment, the diabetes diagnostic engine may measure a patient's HbA1c levels using a monoclonal antibody addlutination reaction. Additionally or alternatively, the diabetes diagnostic engine may be configured to test Albumin levels in the blood sample using an apolyclonal goat anti-human albumin antiserum and to test the creatinine level of the sample using a Benedict Behre chemical reaction. The IDM 104 may compute a ratio of the Albumin level to the creatinine level in the blood sample.

A urinalysis diagnostic engine may be configured to receive a urine sample and to test for one or more characteristics of the urine sample. Example methodologies may include the use of chromatographic detection pads, colorimetric reagent pads (which may change color depending on the concentration of the analyte in the blood), and optical testing systems in which an image of the urine is put under a microscope and an image recognition algorithm identifies substances in the sample.

FIG. 1A shows example components of a diagnostic engine 102N. The diagnostic engine 102N may comprise one or more of a processor 103, memory 140, wireless circuitry 142, heating element 146, mixing means 148, optical sensor 150, pump 152, and reagents 154. It is understood that a given one of the diagnostic engines 102 may optionally comprise any number or any combination of these elements. For example, a diagnostic engine may comprise multiple optical sensors 150 but may not comprise a pump 152. It is further understood that the diagnostic engine may comprise other components not shown in the figures or described herein, such as a separation means or any other components as would be understood by a person skilled in the art. In addition, a first type of diagnostic engine (e.g., a diabetes diagnostic engine) may comprise a different number and/or a different combination of components than a second type of diagnostic engine (e.g., a urinalysis diagnostic engine).

The processor 103 may be configured to process a sample. For example, the processor 103 may be configured to receive an instruction from a user to perform a test on a sample inserted into the diagnostic engine 102 and to output one or more values representing a measured result of the test on that sample. In one embodiment, the processor 103 may be a real-time processor configured to generate one or more measurements within a given time period, such as ten seconds. The processor 103 may additionally or alternatively be a non-real time processor configured to generate measured results based on the measurements from the test samples. In one example, diagnostic engines may comprise multiple processors, such as a real-time processor configured to obtain measurements in real-time and a non-real time processor configured to process the measurements to generate measured results.

The processor 103 may control the various components of the diagnostic engine 102 (e.g., heating element 146, mixing means 148, optical scanners 150, pumps 152, reagents 154 etc.) and may receive feedback from those components. The processor 103 may adjust one or more characteristics of the diagnostic engine 102 accordingly (in real-time) to keep the diagnostic engine 102 within the proper operating conditions and may obtain the measured results of a test performed by the diagnostic engine 102.

The memory 140 may be configured to store information received or generated by the diagnostic engine 102. For example, the memory 140 may be configured to store one or more values representing a measured result of a test performed by the diagnostic engine 102. In one embodiment, the diagnostic engine 102 may comprise limited processing and memory capabilities such that the diagnostic engine 102 is configured only to process a particular type of sample, store one or more values representing a measurements and/or measured result of the test on that sample in the memory 140, and to send the measured results to the IDM 104.

The wireless circuitry 142 may enable the diagnostic engine 102 to communicate with one or more other components of the point of care system 100. For example, the wireless circuitry 142 may enable the diagnostic engine 102 to communicate measured results over a Bluetooth or WiFi connection to the IDM 104. The information may additionally or alternatively be communicated to a printer, an informatics management program, or any other type of information system.

The diagnostic engine 102 may comprise one or more components which can be in communication with the processor 103 and which may be controlled by the processor 103. For example, the diagnostic engine 102 may comprise one or more of a heating element 146 configured to heat a test sample, a mixing means 148 configured to mix one or more components of the test sample, an optical sensor 150 configured to determine one or more optical characteristics of the test sample, and a pump 152 configured to move at least a portion of the sample from one location to another in the diagnostic engine 102. The diagnostic engine 102 may comprise a user interface that enables a user to initiate a test of that particular diagnostic engine 102.

As discussed herein, the system 100 shown in FIG. 1 may comprise any number and any combination of types of different diagnostic engines 102. The diagnostic engines 102 may be configured to receive a test sample, perform a test on the sample, and to send a measured result of that test to the IDM 104. The diagnostic engine 102 may also be configured to store one or more measured results in a memory of the diagnostic engine 102.

The IDM 104 may be configured to receive as input one or more measured results from one or more of the diagnostic engines 102A through 102N. The measured results may be received, for example, over the connection 110 between the one or more diagnostic engines 102 and the IDM 104. In one embodiment, the connection 110 may comprise a wireless connection. For example, the connection may comprise a Bluetooth connection. However, it is understood that the connection 110 may be any type of wireless connection, such as a Zigbee connection, a WiFi connection, or the like. In another embodiment, the connection may comprise a hardwired connection. The connection may be made via a USB cable or any other suitable communication cable interface technology. The measured result may comprise one or more values that represent a measured result of the test performed by the diagnostic engine 102. For example, the IDM 104 may receive a single value from a diabetes diagnostic engine representing an HbA1c value of a blood sample or may receive multiple values from a cardiac diagnostic engine corresponding to total cholesterol, LDL cholesterol, HDL cholesterol, and triglycerides levels of the blood sample.

The IDM 104 may be configured to communicate information to the diagnostic engines 102, such as an instruction to initiate a test, software updates, or changes to the diagnostic engine protocol that may be used by the processor 103 of the diagnostic engine 102 in generating one or more test results. However, it is understood that the IDM 104 does not control the diagnostic engines themselves after sending an instruction to the diagnostic engines to initiate a test. This limitation may be in place to conform with regulations for the IDM and/or the diagnostic engine. Instead, control of the diagnostic engines themselves may be performed by the processor 103 associated with the diagnostic engines and/or instructions received from one or more users at the diagnostic engines.

The IDM 104 may comprise a processor 105 and a memory 106. The processor may perform a variety of higher-level processing functions of the point-of-care system. Such higher-level functions may be performed by executing computer-executable instructions (e.g., program code) stored in a computer-readable medium, such as the memory 106. The IDM 104 may comprise any suitable computing device, such as a tablet computer, laptop computer, desktop computer, personal digital assistant, or other stationary or hand-held computing device.

The processor 105, upon receiving a measured result from a diagnostic engine 102, may be configured to process the measured result so that a calculated result may be presented to a user of the point of care system. For example, the IDM 104 may receive one or more values (e.g., measured results) from the diagnostic engine 102. The processor 105 may be configured to determine which values correspond to certain health markers and may determine how to present those values to a user of the system 100. The processor 105 may be configured to generated calculated results by comparing a received value to one or more other stored or received values and may be configured to compute a ratio of one value to another, such as a triglyceride to HDL cholesterol ratio of a blood sample, in order to generate calculated results. The processor 105 may be a non-real time processor configured to convert measurements received from the diagnostic engine 102 into calculated results capable of being displayed to a user. The non-real time processor 105 may be configured to receive one or more measured results from the processor 103 upon completion of a test and may process the information as discussed above. In one embodiment, power for the one or more diagnostic engines 102 may be provided by the IDM 104. Additionally or alternatively, the diagnostic engines 102 may provide power for the IDM 104.

The memory 106 may be configured to store a measured result received from any of the diagnostic engines 102 and/or one or more calculated results generated by the IDM 104. The memory 106 may be configured to store any number of measured or calculated results before they are deleted (e.g., one thousand results) or may be configured to store the measured or calculated results for a determined period of time (e.g., one year). The memory 106 may further store information associated with one or more patients. For example, the memory 106 may store patient information such as an identifier associated with the patient, patient last name, patient first name, patient gender, and patient date of birth. The memory 106 may store patient's test results along with the patient information so that they may be retrieved at a later date. While not shown in the figures, it is understood that one or more of the diagnostic engines 102 may comprise a memory similar to the memory 106 that is configured to store one or more measurements and/or one or more measured results.

The user interface 108 may be configured to present one or more calculated results to a user of the interface. The user interface 108 may comprise one or more of a display screen, a touch panel, an audio speaker, and a microphone. The user interface 108 may be controlled by the IDM 104. The functionality of the user interface may be implemented, at least in part, by computer-executable instructions (i.e., program code or software) executing on the processor 105 of the IDM 104. The IDM 104 may receive over the connection 110 one or more measured results from one or more diagnostic engines 102, process the measured results to generate calculated results, and present the calculated results and other information such as patient information via the user interface 108.

The user interface 108 may be diagnostic engine agnostic, meaning that it may be able to present results associated with any number of diagnostic engines and any type of diagnostic engine. The user interface 108 may allow multiple diagnostic engines to be operated at the same time and using the same interface. A user of the interface 108 may be able to begin a test, enter or view patient information, enter login credentials, view the time remaining on a particular test, and view the calculated results based on a test performed by a given diagnostic engine 102.

The interface 108 may allow for common screens and elements between different types of diagnostic engines, improving efficiency of the system as a user of the interface 108 may only need to learn a single interface. Common elements may be presented on the interface. Additionally or alternatively, specific instructions such as product specific instructions may be presented on the interface 108 which may be accessed from the single home screen.

The user interface may comprise a feature (e.g., a "past entry" or "last patient" feature) that enables a user via an icon on the user interface to populate patient information from one or more previous tests. For example, a user who is running a urine test may enter patient information such as patient name, patient age and patient gender. The user may then select to run that test. The user may then begin to prepare a second test (e.g., a blood test) and may opt to auto-populate, via an icon on the user interface, the information for the second test with the information from the first test, such as the patient name, patient age and patient gender. This feature may be available even if the first diagnostic engine is a different diagnostic engine than the second diagnostic engine.

The user interface 108 may enable remote login connections. For example, a user may access calculated results based on a test performed by a given one of the diagnostic engines 102 through a user interface on a cellular telephone of the device. However, the privileges provided to a user through a remote user interface may be limited. A user may be able to view calculated results from a remote user interface, but may be unable to manage the diagnostic engines themselves (e.g., to begin a new test) from the remote interface. In one example, if software is installed on a device (e.g., a cellular telephone) to enable control of the IDM 104, the device may only have the functionality to control the IDM and may not be able to perform any other functionality.

The user interface 108 may display the status or calculated results of a test. The user interface 108 may display the status or calculated results of multiple tests simultaneously. For example, if a user is running a urine test on a first patient and a blood test on a second patient, the user may be able to view one or more of the status or the calculated results of the urine test and the blood test on a single screen. This may be the case even when the urine test is being performed on a urinalysis diagnostic engine manufactured by a first company and the blood test is being performed on a blood testing engine manufactured by a second company. In one example, the user interface may be configured to simultaneously display calculated results associated with two different users of the interface 108. For example, the user interface 108 may simultaneously display a blood test result for a first patient that was initiated by a first user of the interface 108 and a urine test result for a second patient that was initiated by a second user of the interface 108. One or more of the blood diagnostic engine and the urine diagnostic engine may not be hardwired to the user interface 108.

In one example, one or more of the processor 105 and the memory 106 associated with the IDM 104 may be external to the IDM 104. For example, the processor 105 and the memory 106 may be located in a cloud.

The bar code reader 112 may be configured to read a bar code. For example, the bar code reader 112 may be configured to read a bar code on a test sample in order to determine a patient identifier (e.g., patient demographics) and type of test sample being received. Additionally or alternatively, the bar code reader 112 may be configured to scan an ID badge or other identifier of an operator of the user interface 108 in order to identify or authenticate the operator. The IDM 104 may receive, from the bar code reader 112 and over the connection 114, information including but not limited to patient information, test sample information and/or operator information. In one embodiment, the connection 114 may be a USB communication or a hardwired connection. However, it is understood that the connection 114 may be any type of connection such as a Bluetooth or a WiFi connection.

The removable storage 116 may be configured to store measured results, calculated results, patient information, and other information similar to that stored in the memory of the IDM 104. For example, the removable storage 116 may store patient information such as an identifier associated with the patient, patient last name, patient first name, patient gender, and patient date of birth, and may associate measured and/or calculated results with the stored patient information. The removable storage 116 may comprise, for example, an external hard drive or flash memory. However, the removable storage 116 may be any type of removable storage device.

The local printer 118 may be configured to print data received from the IDM 104. The data may comprise one or more of a calculated result, patient information, operator information, time and date of the test, and any other information that is capable of being printed. In one embodiment, the printer may communicate with and receive data from the IDM 104 over a Bluetooth connection. However, it is understood that the IDM 104 and the local printer 118 may communicate over any type of connection.

The Bluetooth barcode reader 120 may be configured to read one or more barcodes. The Bluetooth barcode reader may operate in a similar manner to the barcode reader 112, except that its connection to the IDM 104 may be wireless (i.e., Bluetooth). For example, the bar code reader 112 may be configured to read a bar code on a test sample in order to determine a patient identifier and type of test sample being received. Additionally or alternatively, the bar code reader 112 may be configured to scan an ID badge or other identifier of an operator of the user interface 108 in order to identify or authenticate the operator. In one embodiment, the Bluetooth barcode reader 120 may be a handheld barcode reader, such as a mobile device, a wrist watch, or anything that behaves like a barcode scanner. Other operator information may include but is not limited to a key fob, an RFID or any type of biometric indicator.

The network infrastructure 122 may comprise one or more of an informatics system 124, a network printer 126, a network file system 128 and a web enabled device 130. The network infrastructure may communicate with the IDM 104 over the communications link 134. In one embodiment, the communications link 134 may be a WiFi communications link. However, it is understood that the communications link may be any type of communications link such as Bluetooth, Zigbee, Ethernet, etc.

The informatics system 124 may be configured to store information regarding how one or more users of the point of care system interact with the point of care system. The informatics system 124 may comprise one or more computing devices. For example, the informatics system 124 may be configured to download and store information associated with one or more patients and one or more operators of the system. The informatics system may comprise any type of system that is capable of receiving information from the IDM 104, including but not limited to a point of care system, a laboratory system, or other system implemented in a hospital.

The network printer 124 may print data received from the IDM 104. The data may comprise one or more of a calculated result, patient information, operator information, time and date of the test, and any other information that is capable of being printed. In one embodiment, the network printer 124 may communicate with and receive data from the IDM 104 over the WiFi connection 134 or any other connection.

The network file system 128 may store data received from the IDM 104. For example, the network file system 128 may be configured to store information including but not limited to calculated results, patient information such as a patient identifier, patient last name, patient first name, patient gender, and patient date of birth, time and date, and operator information. The network file system 128 may store measured or calculated results with the patient and/or operator information.

In an embodiment of the invention, one or more individual diagnostic engines are not able to directly interface or communicate with devices other than IDM 104 and any relevant consumable. Rather the diagnostic engines relay information to/from IDM 104 which, in turn, controls all communication to/from with the outside world via barcode reader 112, the removable storage 116, the local printer 118, the bluetooth barcode reader 120, the informatics system 124, the network printer 126, the network file system 126, or any other entity. By controlling these "world interfaces," individual diagnostic engines need only contain those components necessary to arrive at a specific measured result while the IDM 104 houses those components needed to interface with other devices/databases—resources that can be shared among multiple diagnostic engines.

In yet another embodiment of the invention, one or more individual diagnostic engines have limited abilities to directly interface or communicate with devices other than IDM 104 and any relevant consumable. For example, a diagnostic engine may be able to receive information about a consumable (such as lot numbers, calibration information, and/or serial number) from the consumable itself using a device such as a barcode reader or a camera coupled to the diagnostic engine. In this embodiment, all remaining communications are relayed to/from the diagnostic engine and the IDM 104 which, in turn, controls all communication to/from with the outside world via barcode reader 112, the removable storage 116, the local printer 118, the bluetooth barcode reader 120, the informatics system 124, the network printer 126, the network file system 126, or any other entity. It should be appreciated that illustrative systems can have a combination of diagnostic engines with no or limited abilities to communicate to a device other than the IDM 104.

It is understood that the system 100 and any of the components described herein may be part of an "open system." For example, the IDM 104 may be configured to connect and communicate with diagnostic engines 102 from a variety of manufacturers. The IDM 104 may be configurable to download or install new software that enables the IDM 104 to communicate with the variety of diagnostic engines 102. The user interface 108 may comprise an icon that enables one or more new diagnostic engines to be added to the IDM 104. In one example, a given diagnostic engine 102 may only be controllable by a single IDM 104. In another example, a diagnostic engine 102 may be controllable by a plurality of IDMs 104.

In one example, both the diagnostic engine and the IDM may be developed by the same manufacturer. In another example, the diagnostic engine may be developed by an external partner of the manufacturer that utilizes both of the diagnostic engines user interface and world interfaces. The IDM software may need to be updated to accommodate such a diagnostic engine. In another example, the diagnostic engine may be developed by an external partner of the manufacturer that utilizes only the world interface of the diagnostic engine but not the user interface. In another example, the diagnostic engine may be a virtual engine that works in cooperation with the hardware and software of other external devices. In an example, this could be a blood pressure monitor that allows the IDM to combine results from the blood pressure monitor with other measured or calculated results to generate new calculated results. In another example, the diagnostic engine may be a virtual engine that comprises only an application that can obtain and manipulate data. For example, the diagnostic engine may submit a questionnaire to a patient, measure ambient temperature, humidity, etc. These results may be combined with other measured or calculated results to generate new calculated results.

Figure 2:
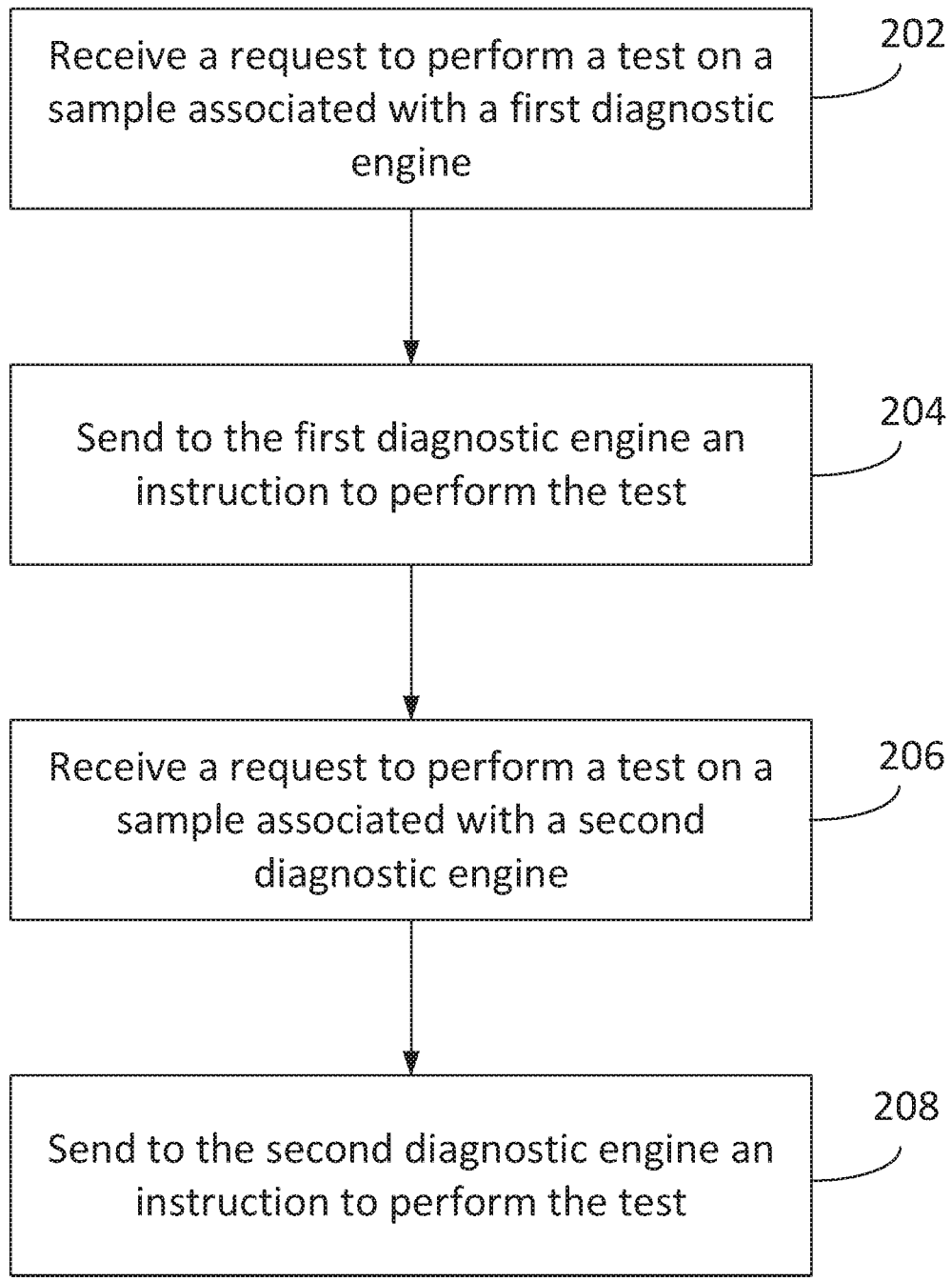
FIG. 2 shows a flow chart of an example method according to an aspect of the disclosure.

FIG. 2 shows an example method in accordance with an aspect of the disclosure. At step 202, a request to perform a test on a first sample may be received. The request may be received, for example, via a user interface associated with a point of care system and from a first user of the point of care system. The first sample may be inserted into a first diagnostic engine of a plurality of diagnostic engines associated with the point of care system. The plurality of diagnostic engines may perform testing on a sample inserted into the diagnostic engine. The plurality of diagnostic engines may comprise, for example, a blood gas diagnostic engine, a cardiac diagnostic engine, a coagulation diagnostic engine, a diabetes diagnostic engine and/or a urinalysis diagnostic engine. The user interface associated with the IDM configured to communicate with one or more of the plurality of diagnostic engines. The first sample may comprise, for example, a blood sample or a urine sample collected from a patient associated with the point of care system. The first user may be an operator of the point of care system, such as a doctor, a nurse, a lab technician, or a patient.

At step 204, an instruction to perform a test on the first sample may be sent to the first diagnostic engine. The user interface may display an icon representing the first diagnostic engine. The icon may indicate a status of the first diagnostic engine. For example, the icon may represent a status of the test performed by the first diagnostic engine in terms of a percentage complete or a time remaining. It is understood that the diagnostic engine may additionally or alternatively begin a test on a sample without receiving a command from the IDM. For example, a diagnostic engine may begin a test automatically upon insertion of a sample or based on one or more instructions received from a user at the diagnostic engine.

At step 206, a request to perform a test on a second sample may be received via the same user interface 108 from a second user, who may be different from the first user. The second sample may be inserted into a second diagnostic engine of a plurality of diagnostic engines associated with the point of care system. The second diagnostic engine may a different type of diagnostic engine than the first diagnostic engine. For example, the first diagnostic engine may be a diabetes diagnostic engine and the second diagnostic engine may be a urinalysis diagnostic engine. In another embodiment, the first diagnostic engine and the second diagnostic engine may be the same type of diagnostic engine.

At step 208, an instruction to perform a test on the second sample may be sent to the second diagnostic engine. The user interface may display an icon representing the second diagnostic engine. The icon may indicate a status of the second diagnostic engine. For example, the icon may represent a status of the test performed by the second diagnostic engine in terms of a percentage complete or a time remaining of the test. The first test and the second test may be performed substantially simultaneously (e.g., such that at least a portion of the processing of the first sample and the processing of the second sample overlap).

Figure 3:
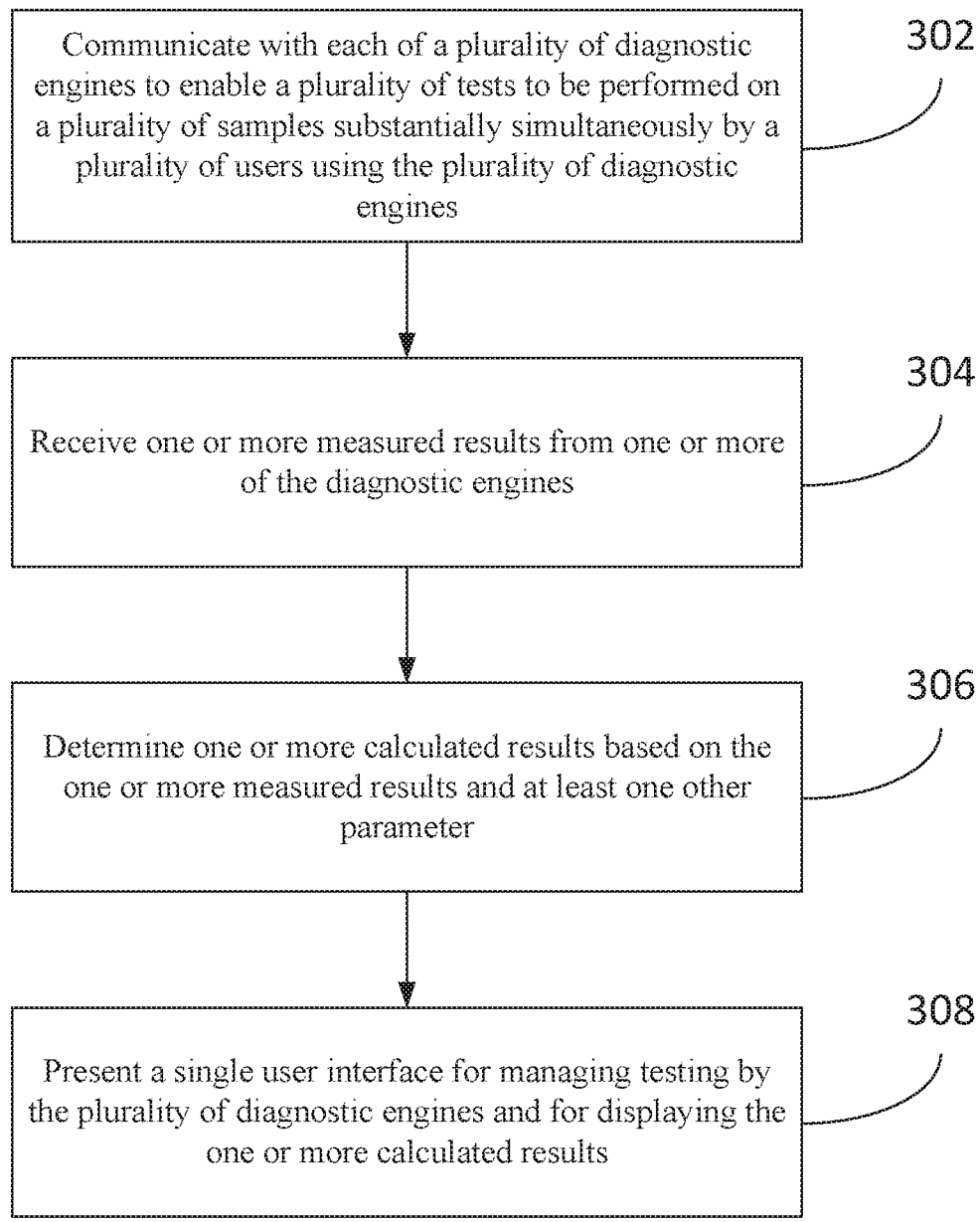
FIG. 3 shows a flow chart of an example method according to an aspect of the disclosure.

FIG. 3 shows an example method in accordance with another aspect of the disclosure. At step 302, a first test of a first sample inserted into a first one of a plurality of diagnostic engines may be initiated. The first test may be initiated in response to a first user input received from a first user via the user interface 108 of the point of care system 100. At step 304, the IDM may receive one or more measured results from one or more of the diagnostic engines. At step 306, the IDM may determine one or more calculated results based on the one or more measured results and at least one other parameter.

At step 304, a second test of a second sample inserted into a second one of the plurality of diagnostic engines may be initiated. The second test may be initiated in response to a second user input received from a second user via the user interface 108 of the point of care system 100. The second diagnostic engine may perform testing on a second sample inserted into the diagnostic engine. The first test and the second test may be performed substantially simultaneously. Substantially simultaneously is understood to mean that the first test and the second test are being processed at the same time or nearly the same time. In one example, the first test and the second test may have the same start time and/or the same end time. In another example, the first test may be processed by the first diagnostic engine at the same time that the second test is processed by the second diagnostic engine such that at least a portion of the first test and the second test overlap. In another example, the first test and the second test may not overlap but may be performed within a similar time frame (e.g., seconds or minutes apart).

Figure 4B:
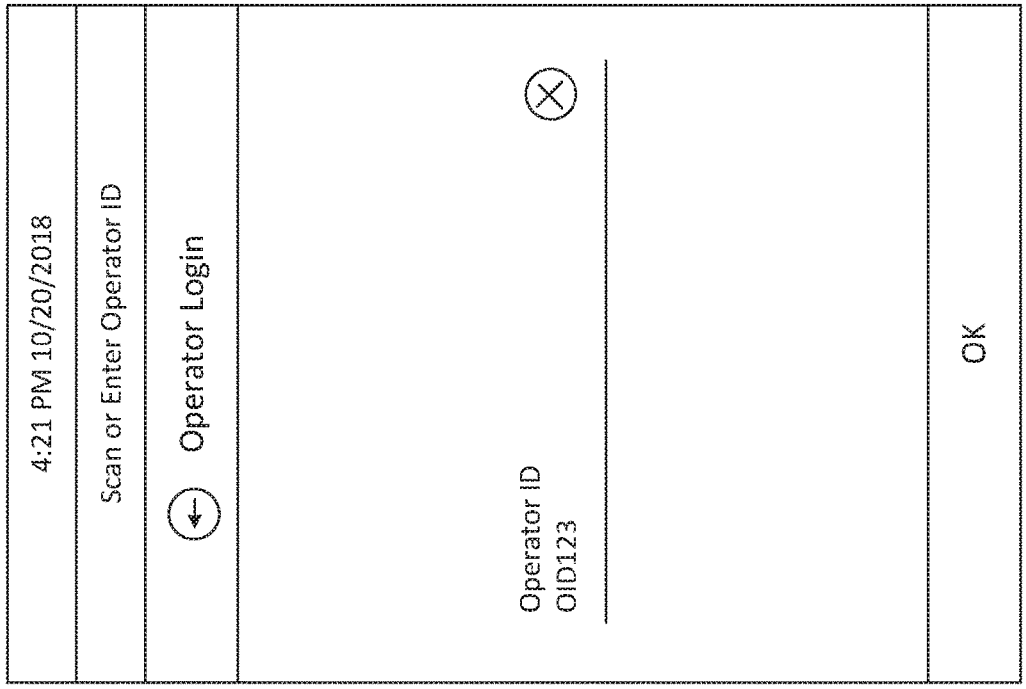
FIG. 4B shows an example operator login page of the user interface.
Figure 4A:
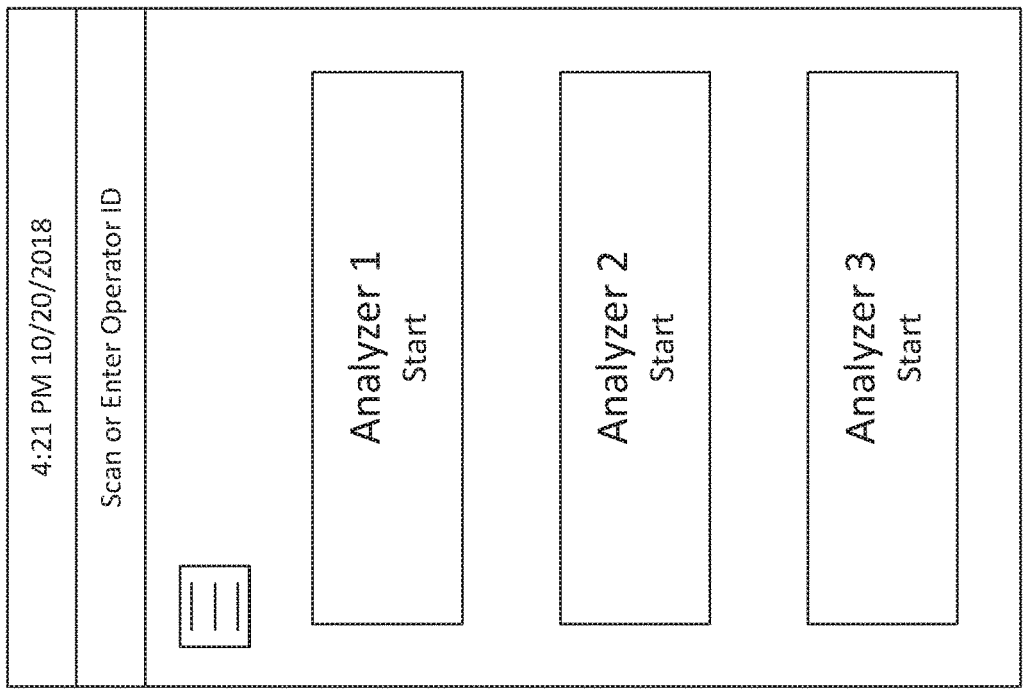
FIG. 4A shows example icons presented by a user interface for representing a plurality of diagnostic engines.
Figure 4F:
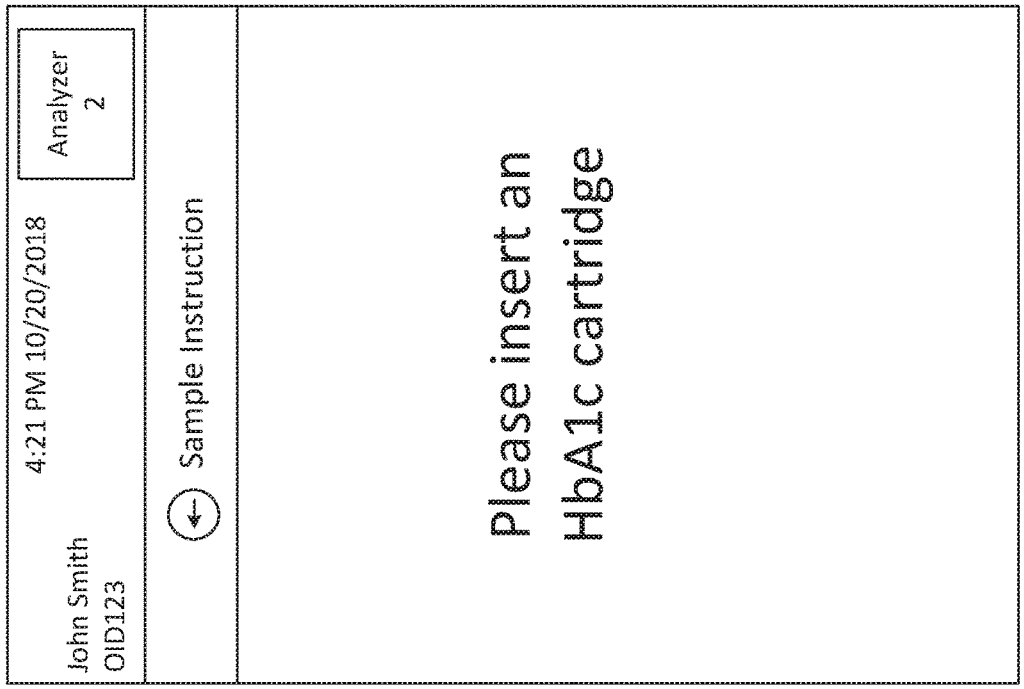
FIG. 4F shows an example prompt displayed by the user interface.
Figure 4E:
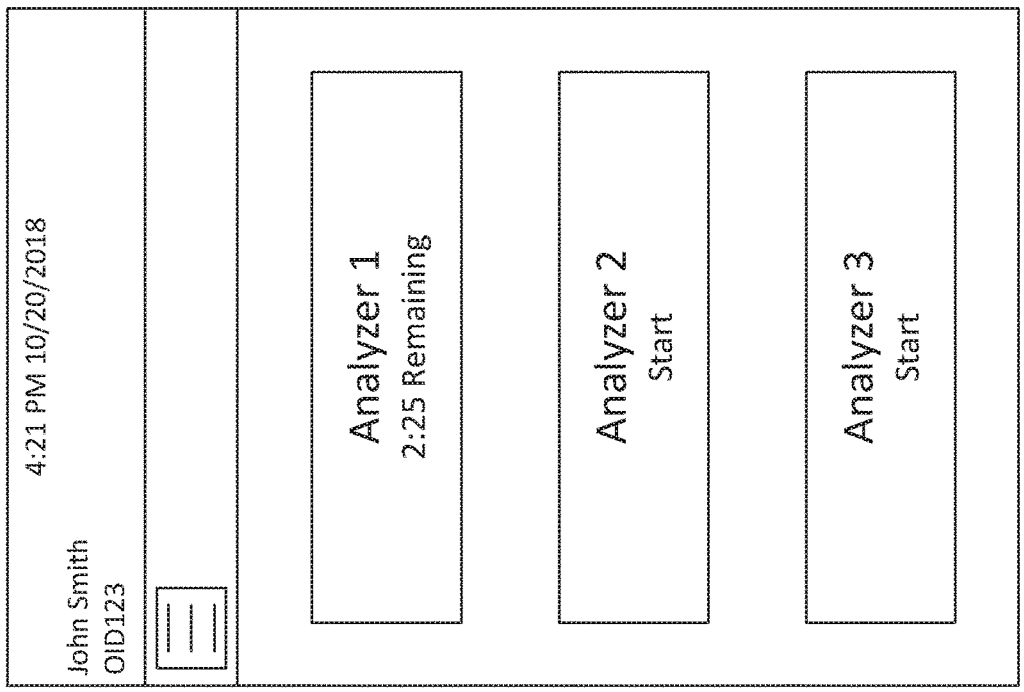
FIG. 4E shows example icons presented by a user interface for representing the plurality of diagnostic engines.
Figure 4N:
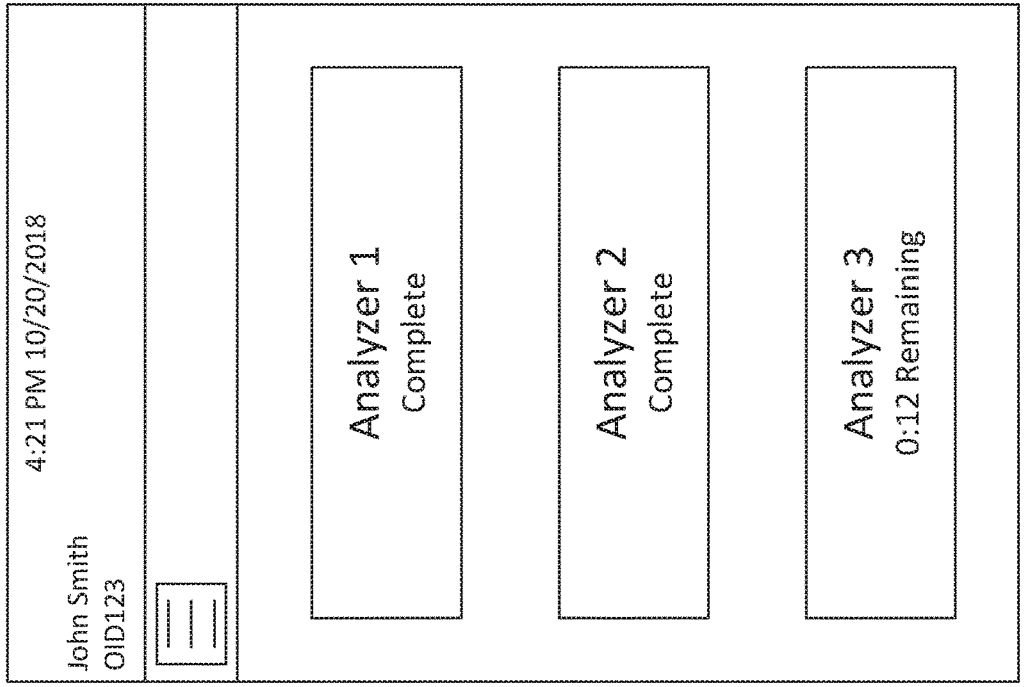
FIG. 4N shows example icons presented by a user interface for representing the plurality of diagnostic engines.
Figure 4M:
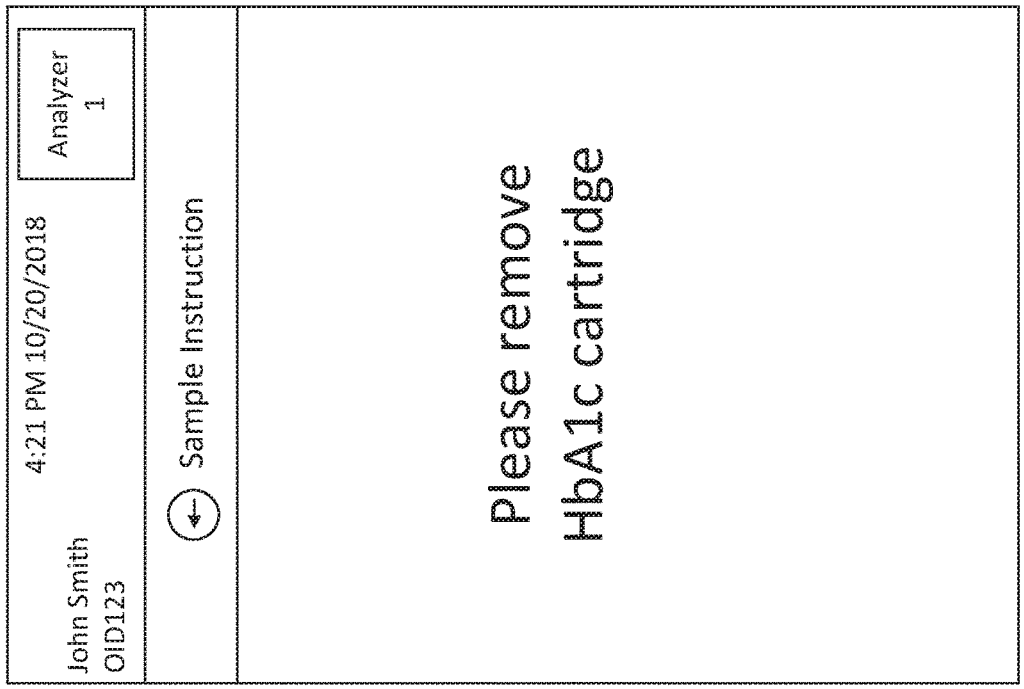
FIG. 4M shows an example prompt displayed by the user interface.
Figure 4T:
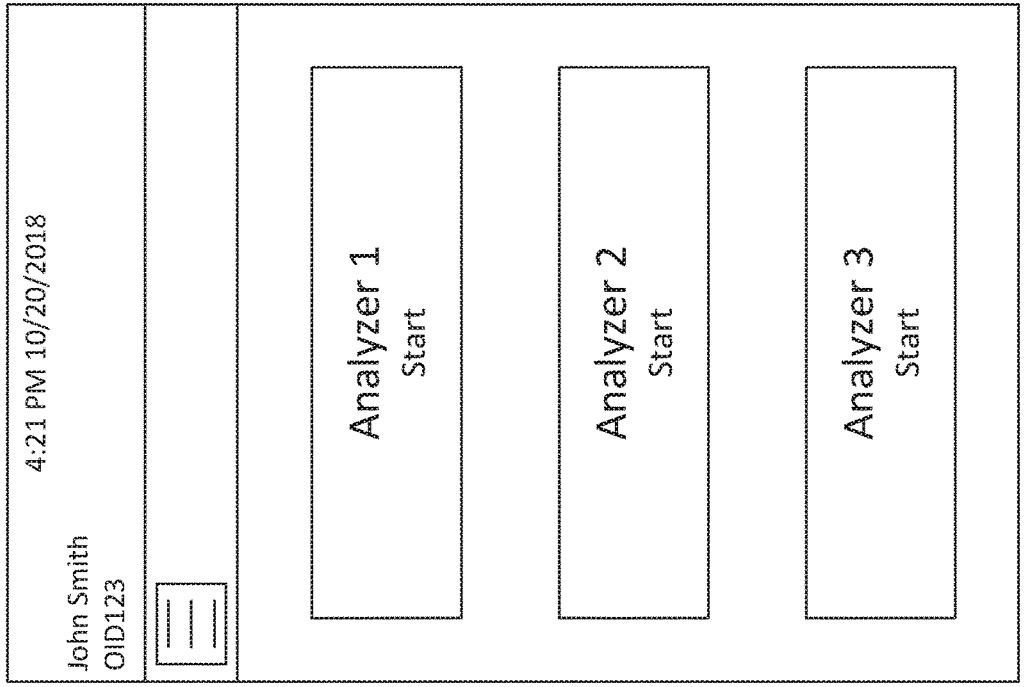
FIG. 4T shows example icons presented by a user interface for representing the plurality of diagnostic engines.
Figure 4S:
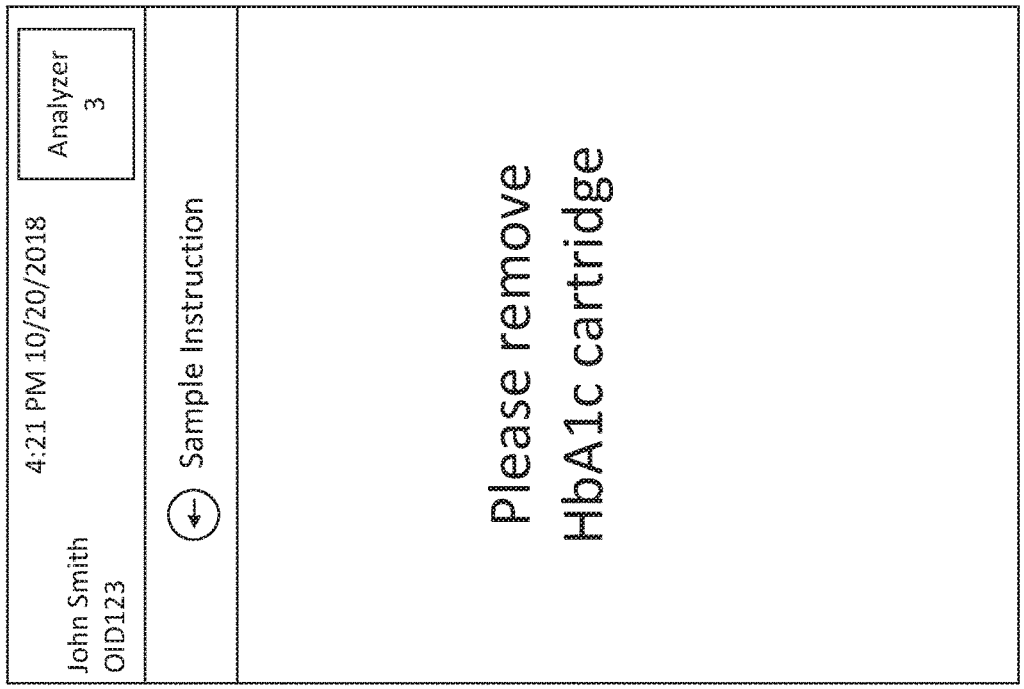
FIG. 4S shows an example prompt displayed by the user interface.
Figure 4U:
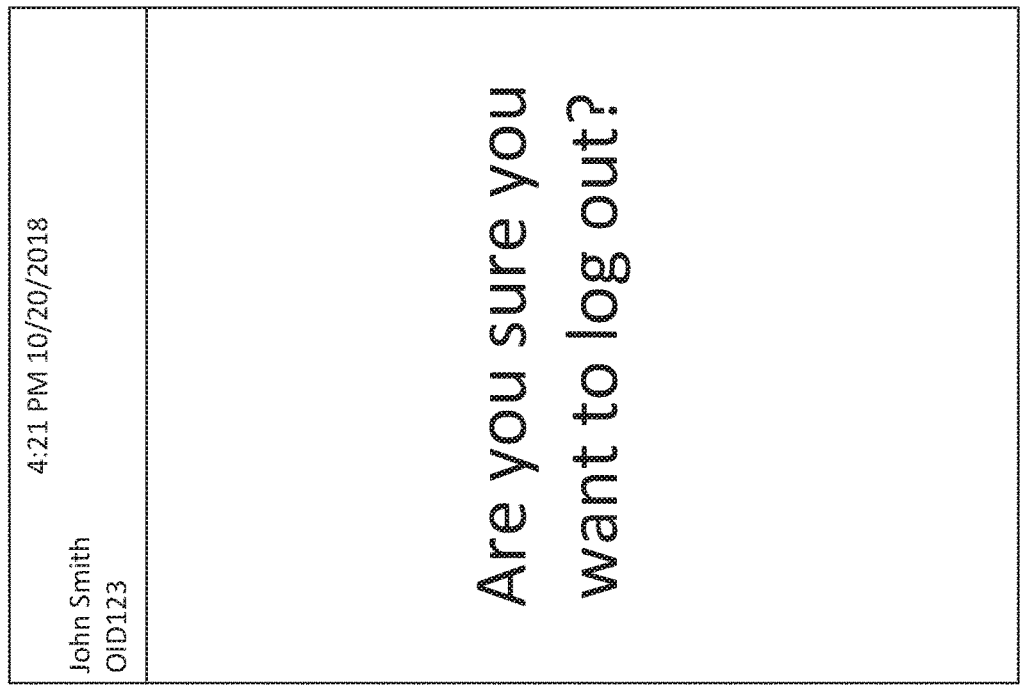
FIG. 4U shows an example prompt displayed by the user interface.
Figure 4V:
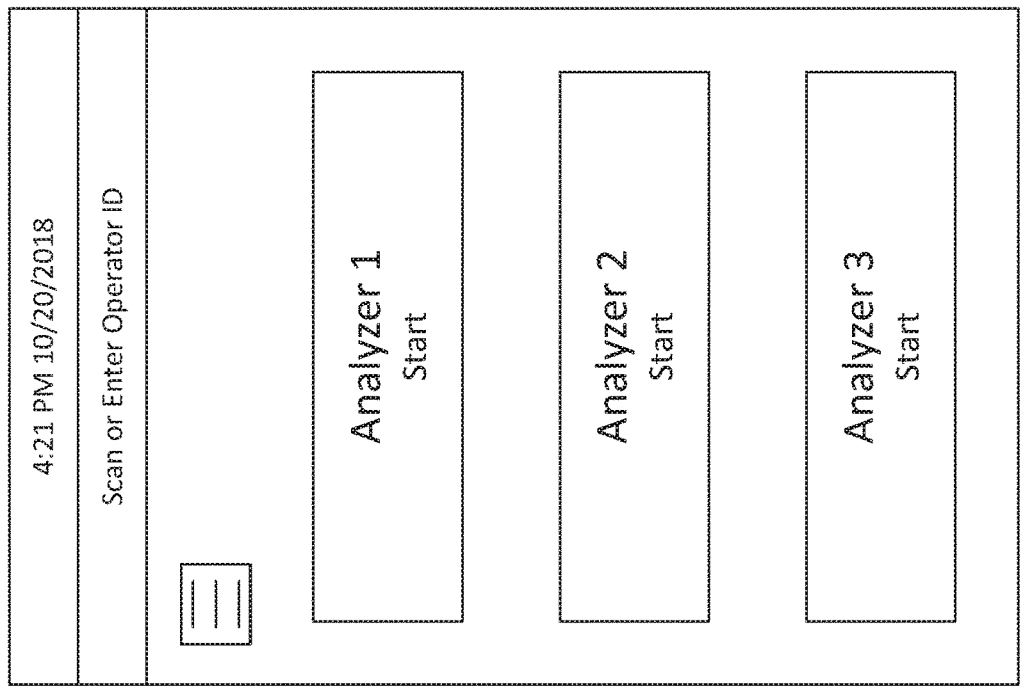
FIG. 4V shows example icons presented by a user interface for representing a plurality of diagnostic engines.

FIGS. 4A-4V show an example operation of a user interface of an IDM according to an aspect of the disclosure. As shown in FIG. 4A, the user interface may display one or more diagnostic engines that are available for use by one or more users. A diagnostic engine may also be referred to herein as an analyzer. The user interface may be configured to display one or more icons, each of the one or more icons corresponding to a diagnostic engine in communication with the IDM. The one or more diagnostic engines may be connected to the IDM using, for example, a wireless connection such as a Bluetooth connection, a WiFi connection, a Zigbee connection, or the like. Alternatively, a diagnostic engine may be connected to the IDM via a wired connection, such as via a USB cable or the like. The IDM, and hence user interface, may be in communication with any number of diagnostic engines and thus may display any number of icons corresponding to each of those diagnostic engines. In addition, the user interface may be in communication with multiple different types of diagnostic engines simultaneously. For example, the user interface may be in communication with one or more of a blood gas diagnostic engine, a cardiac diagnostic engine, a coagulation diagnostic engine, a diabetes diagnostic engine and a urinalysis diagnostic engine. Thus, while FIG. 4A shows a user interface in communication with three diabetes diagnostic engines, it is understood that the user interface may be in communication with any number and any combination of different diagnostic engines.

The user interface shown in FIG. 4A displays the current time and date, three icons corresponding to three HbA1c diagnostic engines, a drop down menu, and a prompt for a user to scan or enter an operator ID (e.g., user name). However, it is understood that that the user interface is not limited to this information or these configurations. For example, the icons presented by the user interface may comprise any shape or color. The icons may be small icons, large icons, square icons, gray icons, blue icons, etc., or the diagnostic engines may be illustrated using any other representation known in the art such as through a list of diagnostic engines. While the diagnostic engines shown in FIG. 4A are labeled "Analyzer 1," "Analyzer 2" and "Analyzer 3," it is understood that the diagnostic engines may be labeled using other information which may be changed or edited by the user. For example, a "Diabetes Analyzer" may be represented by a round, gray icon, a "Blood Gas Analyzer" may be represented by a square, blue icon and a "Urinalysis Analyzer" may be represented by a diamond-shaped, purple icon. The analyzers may be organized based on, for example, an alphabetical listing, by the most popular analyzers, by the most recently used analyzers, by the most recently connected analyzers, etc. It is understood that the user interface is not limited by any of the examples described herein or any of the examples shown in the figures.

As shown in FIG. 4B, upon selection of a given one of the diagnostic engines, the user may be prompted via the user interface to enter log on credentials (e.g., "Operator Login" information). As shown in the figure, the log on credentials may comprise a user identifier (e.g., "Operator ID") and a password. In one example, the first user may not be able to begin a test or otherwise interact with the plurality of diagnostic engines without entering the user's log on credentials via the user interface. In another example, the first user may be able to begin a test without entering login credentials but may not be able to view a result of that test without entering login credentials. In yet another example, the system may not require the entry of login credentials either before beginning a test or before viewing the results of the test. In yet another example, the system may require the entry of login credentials both before beginning a test and before viewing a result of that test.

In one embodiment, the log on credentials may be encoded in a barcode that is scannable using a barcode reader associated with the user interface. For example, the user may select the "scan" button in order to enable a barcode scanner of the user interface to scan a bar code containing the user's log on credentials. The point of care system may use voice recognition and biometric information such as facial recognition techniques in order to obtain log on credentials of a user. It is understood that the login credentials may be entered by any number of methods, such as through a keyboard presented by the user interface or using speech to text processing.

The user interface may comprise a list and/or a drop-down menu displaying a number of operator identifiers, such as all or a portion of the users that work in the location that the point of care system is located. The user may select from a given one of those identifiers in order to enter their login credentials. Additionally or alternatively, the user may be prompted to enter a password in addition to the operator identifier in order to gain access to the point of care system.

As shown in FIG. 4C, the user interface may prompt the user to insert a test cartridge into a diagnostic engine. For example, as shown in this figure, if the user selected an HbA1c diagnostic engine in a previous step, the user may be prompted to insert an HbA1c cartridge containing a blood sample into an HbA1c diagnostic engine. In the example that there are multiple HbA1c diagnostic engines connected to the user interface, the user interface may prompt the user to insert the HbA1c cartridge into any of the HbA1c diagnostic engines or may prompt the user to insert the HbA1c cartridge into an HbA1c diagnostic engine corresponding to the icon selected by the user. It is understood that the user interface may prompt the user to insert any type of test cartridge corresponding to the icon selected by the user. For example, if the user selected an icon corresponding to a urinalysis diagnostic engine, the user interface may prompt the user to insert a urine sample into the urinalysis diagnostic engine.

In one embodiment, the user may insert a test sample into a given one of the diagnostic engines prior to selecting a given one of the diagnostic engines. In this embodiment, the user interface may skip the step of prompting the user to insert a test cartridge, or may prompt the user to select from any of the available diagnostic engines or from a portion of the available diagnostic engines which diagnostic engine they would like to select. Upon insertion of the test sample into the diagnostic engine and/or selection of a given one of the diagnostic engines, the user may select the "OK" button to proceed to the next screen. It is understood that this may be any type of button, such as a "proceed" button. In one example, the user may communicate verbally with the user interface to proceed, such as by uttering the verbal command "next screen." In another example, the user interface may proceed automatically to the next screen upon detection of a test sample being inserted into a given one of the diagnostic engines.

As shown in FIG. 4D, the user interface may display patient information and/or may prompt the user to enter patient information associated with the selected test sample. For example, the user interface may display or may prompt the user to enter an identifier associated with the patient, patient last name, patient first name, patient gender, and patient date of birth. The patient identifier may be any combination of letters, numbers, symbols, etc. It is understood that the patient information is not limited to this information. For example, the user interface may also display or prompt the user to enter the patient's, height, weight, pre-existing conditions, past test results, etc. In addition, the user interface may not display some of this information, such as the patient's name, in order to keep the patient information anonymous. In one embodiment, the user interface may be configured to scan a barcode in order to determine the patient information. For example, the barcode may be located on the test sample and may be read and decoded by the user interface in order to display the patient information. Additionally or alternatively, the user may need to manually enter all or some of the patient information via the user interface.

The user interface may present additional icons such as a "recent patients" icon and a "patient list" icon in order to assist the user in entering the patient information. For example, the recent patient's icon, when selected by a user, may cause the user interface to display a number (e.g., twenty-five) of the most recent patients associated with the point of care system. Rather than manually entering a patient's information, the user may select the recent patient's icon and may select the patient's name or identifier from the list. Selecting of the patient list icon by a user may cause the interface to display a list of all patients who have ever been associated with a given one of the diagnostic engines or all patients associated with the location of the diagnostic engine, such as all patients in a nursing home where the point of care system is located.

As shown in FIG. 4E, after entering or confirming the patient information, the diagnostic engine may begin running a test on the test sample. The user interface, in response to the prompt from the user, may instruct the diagnostic engine corresponding to the selected icon to begin running a test on the sample. The user interface may be configured to display a status of one or more of the diagnostic engines. In one embodiment, the user interface may be configured to display an icon representing a status of each of the plurality of available diagnostic engines. As shown in this figure, the user interface may display a status of a test being performed by Analyzer 1 and may display that Analyzer 2 and Analyzer 3 are available for use. For example, the user interface may display that the test being performed by Analyzer 1 has two minutes and twenty-five seconds remaining until completion. The user interface may display the status of a given diagnostic engine in any number of ways. For example, the user interface may display a percentage complete, a time remaining, a time elapsed, and/or may display graphically the status of the diagnostic engine (e.g., using a graphical status indicator).

Each icon presented by the user interface may correspond to a single diagnostic engine. The icon corresponding to the diagnostic engine may allow the user to cancel a test after it has begun running, for example by prompting the user to click an "x" button, as shown in the figure. In addition, the user interface may allow a user to pause the test or to interact with the test in any number of ways. As also shown in the figure, the user interface may allow the same user or a different user to begin a new test while the first test is still running. In one embodiment, the user interface may prompt the user to enter their credentials each time a new test is selected, regardless of the user currently logged into the system. In another embodiment, the user interface may allow an operator to begin another test without requiring that operator to enter their login credentials. The user may "log out" of the system, for example, by selecting a log out option from the drop-down menu of the user interface.

As shown in FIG. 4F, in response to the user selecting a different one of the icons corresponding to a different one of the diagnostic engines, the user interface may prompt the user to insert a second test cartridge into a second one of the diagnostic engines. It is understood that the second diagnostic engine may be a different type of diagnostic engine than the first diagnostic engine. For example, the first diagnostic engine may be a diabetes test while the second diagnostic engine may be a cardiac diagnostic engine. As discussed herein, the user interface may be diagnostic engine agnostic, meaning that the user interface may be enabled to communicate with a plurality of different types of diagnostic engines. The user of the interface that selected the icon corresponding to the second diagnostic engine may be the first operator that prompted the first test or may be a second operator that is different than the first operator. The interface may prompt the user to enter login credentials prior to instructing them to insert a test cartridge into the diagnostic engine.

As shown in FIG. 4G, the user interface may display patient information or may prompt the user to enter patient information regarding the selected test for the patient associated with the second sample. For example, the user interface may display or may prompt the user to enter one or more of an identifier associated with the patient, patient last name, patient first name, patient gender, and patient date of birth. The second patient may be the same patient as the first patient. For example, the operator may wish to perform an HbA1c test on the patient using a first diagnostic engine and to perform a blood gas test on the same patient using a second diagnostic engine. Alternatively, the second patient may be a different patient than the first patient.

In one embodiment, the user interface may be configured to scan a barcode in order to determine the patient information associated with the second patient. For example, the barcode may be located on the second test sample and may be read and decoded by the user interface in order to display the patient information associated with the second patient. Additionally or alternatively, the user may need to manually enter all or some of the second patient information via the user interface.

As shown in FIG. 4H, the second diagnostic engine may begin running a test on the sample associated with the second patient. The user interface may instruct the diagnostic engine to begin the test on the sample after the user has entered or confirmed the patient information. The user interface may be configured to display an icon representing the status of each of the plurality of available diagnostic engines. As shown in this figure, the user interface may display a status of the test being performed by Analyzer 1 and a status of the test being performed by Analyzer 2, and may display that Analyzer 3 is available for use. For example, the icon corresponding to the first analyzer shows that Analyzer 1 has one minute and forty four second remaining while the icon corresponding to the second analyzer shows that Analyzer 2 has two minutes and twenty two seconds remaining.

The user interface may allow the same user or a different user to begin a new test while the first test and the second test are still running. In one embodiment, the user interface prompt the user for operator credentials each time a new test is selected, regardless of the user currently logged into the system. In another embodiment, the user interface may allow the same operator to begin another test without requiring that operator to enter their login credentials. The user may "log out" of the system, for example, by selecting a log out option from the drop-down menu of the user interface.

As shown in FIG. 4I, in response to the user selecting a different one of the icons corresponding to a different one of the diagnostic engines, the user interface may prompt the user to insert a test cartridge into another one of the diagnostic engines, such as a third diagnostic engine in communication with the user interface. It is understood that the third diagnostic engine may be a different type of engine than the first diagnostic engine and/or the second diagnostic engine. For example, the first type of diagnostic engine may be a diabetes diagnostic engine, the second diagnostic engine may be a cardiac diagnostic engine, and the third diagnostic engine may be a urinalysis diagnostic engine. In another example, the third diagnostic engine may be the same type of diagnostic engine as the first diagnostic engine while the second type of diagnostic engine may be a different type of diagnostic engine.

As shown in FIG. 4J, the user interface may display patient information and/or may prompt the user to enter patient information associated with the selected test sample for the third patient. For example, the user interface may prompt the user to enter an identifier associated with the patient, patient last name, patient first name, patient gender, and patient date of birth. In one embodiment, the user interface may be configured to scan and/or decode a barcode in order to determine the patient information associated with the third patient. The barcode may be located, for example, on the third test sample. Additionally or alternatively, the user may need to manually enter all or some of the third patient information via the user interface.

As shown in FIG. 4K, the third diagnostic engine may begin running a test on the sample associated with the third patient. The user interface may instruct the third diagnostic engine to begin the test on the sample after the user has entered or confirmed the patient information. The user interface may be configured to display an icon representing the status of each of the plurality of available diagnostic engines. The user interface may allow a user to view a result by selecting an icon or other visual representation corresponding to the diagnostic engine that performed the test on the sample. The user may select to view a result independent of the status of any of the other diagnostic engines. It is understood that the result viewed by a user may be a calculated result. The calculated result may be determined by the IDM based on a measured result received from a given one of the diagnostic engines, as described herein.

As shown in FIG. 4L, the user interface may display a result (e.g., a calculated result) corresponding to a test performed by a given one of the diagnostic engines. In one embodiment, any user may view a result without entering their login credentials. For example, in response to an operator of the interface selecting the icon corresponding to Analyzer 1, the user interface may display a result corresponding to the test performed by Analyzer 1. In response to a user selecting the icon corresponding to Analyzer 2, the user interface may be configured to display a result corresponding to the test performed by Analyzer 2. In response to a user selecting the icon corresponding to Analyzer 3, the user interface may generate an alert indicating to the user that the test has not yet been completed, or may display a current result associated with the test even if the test is not yet completed. In another embodiment, the user interface may not display any results unless an operator is currently logged into the system. For example, a first operator that is logged into the system may be able to view results for any patient associated with that operator, such as all results that were initiated using the operator identifier associated with that operator. Additionally, the operator may be able to view results associated with any of the other operators as long as at least one operator is logged into the system. For example, a first doctor in a hospital comprising multiple doctors may be able to view results for tests initiated by that first doctor and may also be able to view results for tests that were initiated by a second doctor as long as the first doctor is logged into the system.

The user interface may be configured to display any type of information in response to selection of an icon by a user of the interface. For example, the user interface may display a value that was received from the diagnostic engine corresponding to a result associated with the test. In the example that the selected icon corresponds to an HbA1c Analyzer, the user interface may display a value corresponding to the patient's HbA1c level, such as 5.6% as shown in this figure. In the example of a user selecting an icon corresponding to a cardiac diagnostic engine, the user interface may display one or more values corresponding to results received from the cardiac diagnostic engine. For example, the user interface may display values corresponding to a patient's total cholesterol, LDL cholesterol, HDL cholesterol, triglycerides, non-HDL cholesterol, and high-sensitivity C-reactive protein.

The user interface may display information other than the information that was received from the diagnostic engine. For example, the user interface may display an operator ID, a patient ID, a date and time of the test, a diagnostic engine identifier, patient first name, patient last name, patient gender, and patient date of birth. It is understood that the user interface may display only a portion of this information and is not limited to the information described here.

The user interface may allow the user to comment on the results. For example, by clicking on the "comment" button, the user may enter information associated with the test, such as "HbA1c levels are within normal range" or "follow-up with patient in six months." The user interface may further allow the user to print the results by clicking on the "print" icon or may allow the user to send the results to another entity by selecting the "transmit" icon. For example, upon the user selecting the "print" icon, the user interface may display a list of printers or may automatically print to a select one of the available printers. Additionally or alternatively, in response to the user selecting the "transmit" icon, the user interface may allow the user to manually enter a destination such as an email address or other system capable of receiving results, or may allow the user to select the destination from a drop-down menu.

As shown in FIG. 4M, the user interface may instruct the user to remove the test cartridge. The user interface may instruct the user to remove the test cartridge corresponding to the icon for which the user is currently viewing the results. The user interface may present this instruction to remove the test cartridge at any point before, during, or after the user has viewed the results associated with the test. In one example, the user interface may only display this message in response to a user selecting that they have viewed the results or that the user has printed or transmitted the results. The user interface may be configured to automatically store the results in a database. This process of storing results may also be performed before, during or after the user has viewed the results of the test performed by the diagnostic engine. The user interface may also display additional information such as how to properly dispose of the test cartridge.

As shown in FIG. 4N, the user interface may display a status of all or some of the diagnostic engines that are connected to the user interface. After the user has viewed a result associated with a given diagnostic engine and has removed the test cartridge from that diagnostic engine, the user interface may display that the diagnostic engine is once again available. For example, the user interface may display an icon corresponding to that diagnostic engine that shows the diagnostic engine as being available for use. As shown in this figure, the user interface may display that Analyzer 1 is available, an indicator that a test performed by Analyzer 2 is complete, and a status of the test being performed by Analyzer 3 (e.g., twelve seconds remaining). It is understood that the user interface may display that the analyzer is available for use at any time after the test being performed by that diagnostic engine is complete.

A user of the interface may select any one of the icons to interact with the diagnostic engine corresponding to that icon. For example, the user may select the icon corresponding to Analyzer 1 in order to perform a test using that analyzer. The user may select the icon corresponding to Analyzer 2 in order to view the results of a test associated with that analyzer. In response to the user selecting analyzer 3, the interface may alert the user that Analyzer 3 is currently running a test and may optionally allow the user to view a partial result of that test.

As shown in FIG. 4O, in response to a user selecting the icon corresponding to Analyzer 2, the user interface may display a result of the test associated with that analyzer. For example, the user interface may display a value that was received from the diagnostic engine corresponding to Analyzer 2. In the example that the selected icon corresponds to an HbA1c Analyzer, the user interface may display a value corresponding to the patient's HbA1c level, such as 4.3% as shown in this figure. The user interface may display additional information other than the information that was received from the diagnostic engine, such as an operator ID, the patient ID, the date and time of the test, a diagnostic engine identifier, patient first name, patient last name, patient gender, and patient date of birth. Additionally or alternatively, the user interface may allow the user to comment on the results, print the results, or transmit the results to one or more other locations.

As shown in FIG. 4P, the user interface may instruct the user to remove the test cartridge. The user interface may instruct the user to remove the test cartridge corresponding to the icon for which the user is currently viewing the results. The user interface may present this instruction to remove the test cartridge at any point before, during, or after the user has viewed the results. In one example, the user interface may only display this message in response to a user selecting that they have viewed the results or that the user has printed or transmitted the results.

As shown in FIG. 4Q, the user interface may display a status of all or some of the diagnostic engines that are connected to the user interface. After the user has viewed a result associated with a given diagnostic engine and has removed the test cartridge from that diagnostic engine, the user interface may display that the diagnostic engine is once again available. For example, the user interface may display an icon corresponding to that diagnostic engine that shows the diagnostic engine as being available for use.

As shown in FIG. 4R, in response to a user selecting the icon corresponding to Analyzer 3, the user interface may display a result of the test associated with that analyzer. For example, the user interface may display a value that was received from the diagnostic engine corresponding to Analyzer 3. In the example that the selected icon corresponds to an HbA1c Analyzer, the user interface may display a value corresponding to the patient's HbA1c level, such as 6.9% as shown in this figure. The user interface may display additional information other than the information that was received from the diagnostic engine, such as an operator ID, the patient ID, the date and time of the test, a diagnostic engine identifier, patient first name, patient last name, patient gender, and patient date of birth. Additionally or alternatively, the user interface may allow the user to comment on the results, print the results or transmit the results to one or more other locations.

As shown in FIG. 4S, the user interface may instruct the user to remove the test cartridge. The user interface may instruct the user to remove the test cartridge corresponding to the icon for which the user is currently viewing the results. The user interface may present this instruction to remove the test cartridge at any point before, during, or after the user has viewed the results. In one example, the user interface may only display this message in response to a user selecting that they have viewed the results or that the user has printed or transmitted the results.

As shown in FIG. 4T, the user interface may indicate that all diagnostic engines currently connected to the user interface are available for use. For example, each of the results (e.g., calculated results) based on tests performed by Analyzer 1, Analyzer 2 and Analyzer 3 have been viewed, each of those diagnostic engines may be available for use by that same user or a different user of the point of care system. The user currently logged in to the user interface may select to log out of the point of care system through the user interface, for example, by selecting a log out option from the drop-down menu. Additionally or alternatively, the user may be logged out of the system after a period of inactivity, such as one minute. In another example, the user may automatically be logged out after viewing a result.

As shown in FIG. 4U, the user may be prompted to verify that they wish to log out. For example, the user interface may display the message "Are you certain that you wish to log out?" and may only log the user out of the system after they have confirmed, for example, by selecting the OK button on the user interface. At this point, the same or different user may log back in to the system by entering their operator credentials via the user interface.

As shown in FIG. 4V, the user interface may display one or more icons or other visual representations illustrating that one or more diagnostic engines are available for use. A given one of the icons may be selected by a user of the interface to begin a test on a sample.

FIGS. 5A-5O shown an example operation of a user interface according to another aspect of the disclosure. As shown in FIG. 5A, the user interface may display one or more diagnostic engines that are available for use by one or more users. A diagnostic engine may also be referred to herein as an analyzer. The user interface may be configured to display one or more icons, each of the one or more icons corresponding to a diagnostic engine in communication with the user interface. The one or more diagnostic engines may be connected to the user interface using, for example, a Bluetooth connection, a WiFi connection, a USB cable or any type of connection known in the art. The user interface may be in communication with any number of diagnostic engines and thus may display any number of icons corresponding to each of those diagnostic engines. In addition, the user interface may be in communication with multiple different types of diagnostic engines simultaneously. For example, the user interface may be in communication with one or more of a blood gas diagnostic engine, a cardiac diagnostic engine, a coagulation diagnostic engine, a diabetes diagnostic engine and a urinalysis diagnostic engine.

The user interface shown in FIG. 5A displays the current time and date, three icons corresponding to three different diagnostic engines, a drop down menu, and a prompt for a user to scan or enter an operator ID. However, it is understood that that the user interface is not limited to this information or these configurations. For example, the icons presented by the user interface may comprise any shape or color. The icons may be small icons, large icons, square icons, gray icons, blue icons, etc., or the diagnostic engines may be illustrated using any other representations known in the art such as through a list of diagnostic engines. While the diagnostic engines shown in FIG. 5A are labeled "Clinical 1," "Clinical 2" and "Urine Analyzer," it is understood that the diagnostic engines may be labeled using other information which may be changed or edited by the user. In addition, it is further understood that the user interface is not limited by any of the examples described herein or any of the examples shown in the figures.

As shown in FIG. 5B, upon selection of a given one of the diagnostic engines, the user may be prompted via the user interface to enter log on credentials (e.g., "Operator Login" information). As shown in the figure, the log on credentials may comprise a user identifier (e.g., "Operator ID") and a password. In one example, the first user may not be able to begin a test or otherwise interact with the plurality of diagnostic engines without entering the user's log on credentials via the user interface. In another example, the first user may be able to begin a test without entering login credentials but may not be able to view a result of that test without entering login credentials. In yet another example, the system may not require the entry of login credentials either before beginning a test or before viewing the results of the test. In yet another example, the system may require the entry of login credentials both before beginning a test and before viewing a result of that test.

The log on credentials may be encoded in a barcode that is scannable using a barcode reader associated with the user interface. For example, the user may select the "scan" button in order to enable a barcode scanner of the user interface to scan a bar code containing the user's log on credentials. In addition, the point of care system may use voice recognition and biometric information such as facial recognition techniques in order to obtain log on credentials of a user. It is understood that the login credentials may be entered by any number of methods, such as through a keyboard presented by the user interface or using speech to text processing.

In one embodiment, the user interface may display a list and/or a drop-down menu comprising a number of operator identifiers, such as all or a portion of the users that work in the location that the point of care system is located. The user may select from a given one of those identifiers in order to enter their login credentials. Additionally or alternatively, the user may be prompted to enter a password associated with the login credentials in order to gain access to the point of care system. While FIGS. 5A-5O show that the user interface prompts a user to enter his login credentials after selecting a given one of the icons corresponding to a diagnostic engine, it is understood that the user interface may prompt the user to enter their login credentials at any point in the testing process. For example, the user interface may prompt the user to enter their login credentials before viewing and selecting a given one of the icons, prior to beginning a test on a given one of the diagnostic engines, and/or prior to viewing the results (e.g., calculated results) associated with a given diagnostic engine.

As shown in FIG. 5C, the user interface may prompt the user to insert a test sample cartridge into a diagnostic engine. For example, as shown in this figure, if the user selected an HbA1c diagnostic engine in a previous step, the user may be prompted to insert an HbA1c cartridge containing a blood sample into an HbA1c diagnostic engine. In the example that there are multiple HbA1c diagnostic engines connected to the user interface, the user interface may prompt the user to insert the HbA1c cartridge into any of the HbA1c diagnostic engines or may prompt the user to insert the HbA1c cartridge into an HbA1c diagnostic engine corresponding to the icon selected by the user. It is understood that the user interface may prompt the user to insert any type of test cartridge corresponding to the icon selected by the user. For example, if the user selected an icon corresponding to a urinalysis diagnostic engine, the user interface may prompt the user to insert a urine sample into the urinalysis diagnostic engine.

In one embodiment, the user may insert a test sample into a given one of the diagnostic engines prior to selecting a given one of the diagnostic engines. In this embodiment, the user interface may skip the step of prompting the user to insert a test cartridge, or may prompt the user to select from any of the available diagnostic engines or from a portion of the available diagnostic engines which diagnostic engine they would like to select. Upon insertion of the test sample into the diagnostic engine and/or selection of a given one of the diagnostic engines, the user may select the "OK" button to proceed to the next screen. It is understood that this may be any type of button, such as a "proceed" button. In one example, the user may communicate verbally with the user interface to proceed, such as by uttering the verbal command "next screen." In another example, the user interface may proceed automatically to the next screen upon detection of a test sample being inserted into a given one of the diagnostic engines.

As shown in FIG. 5D, the user interface may display patient information and/or may prompt the user to enter patient information associated with the selected test sample. For example, the user interface may prompt the user to enter an identifier associated with the patient, patient last name, patient first name, patient gender, and patient date of birth. The patient identifier may be any combination of letters, numbers, symbols, etc. It is understood that the patient information is not limited to this information. For example, the user interface may also display or prompt the user to enter the patient's, height, weight, pre-existing conditions, past test results, etc. In addition, the user interface may not display some of this information, such as the patient's name, in order to keep the patient information anonymous. In one embodiment, the user interface may be configured to scan a barcode in order to determine the patient information. For example, the user may select the "scan" button in order to enable a barcode scanner of the user interface. The barcode may be located on the test sample and may be read and decoded by the user interface in order to display the patient information. Additionally or alternatively, the user may need to manually enter all or some of the patient information via the user interface.

The user interface may present additional icons such as a "recent patients" icon and a "patient list" icon in order to assist the user in entering the patient information. For example, the recent patients icon, when selected by a user, may cause the user interface to display a number (e.g., twenty-five) of the most recent patients associated with the point of care system. Rather than manually entering a patients information, the user may select the recent patients icon and may select the patient's name or identifier from the list. Selecting of the patient list icon by a user may cause the interface to display a list of all patients who have ever been associated with a given one of the diagnostic engines or all patients associated with the location of the diagnostic engine, such as all patients in a nursing home where the point of care system is located.

Figure 5F:
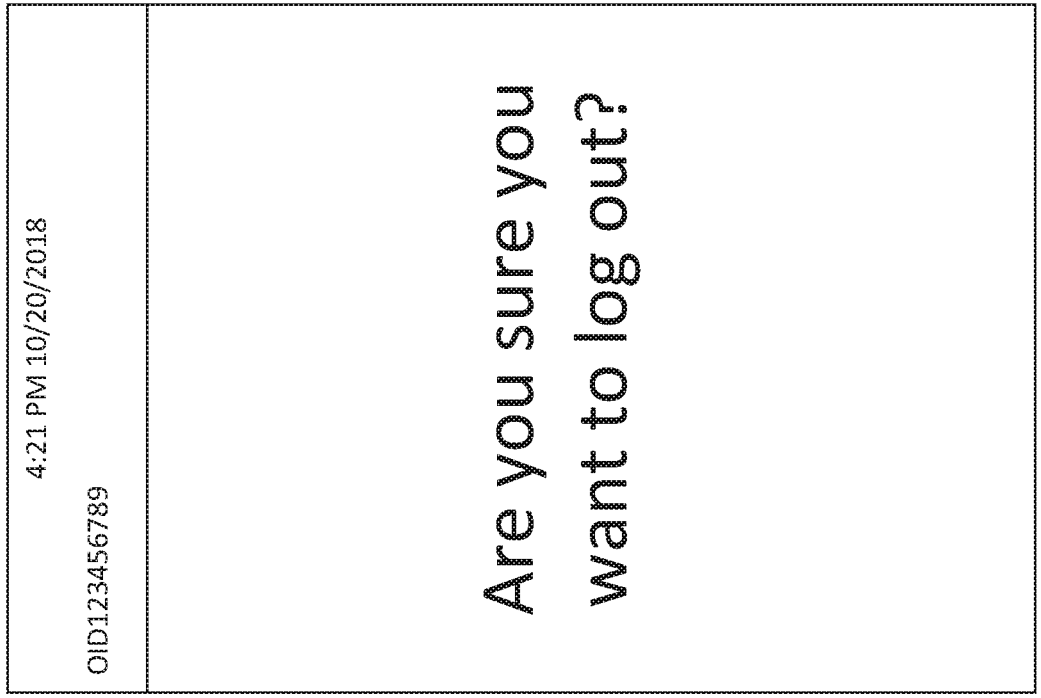
FIG. 5F shows an example operator log out page of the user interface.
Figure 5E:
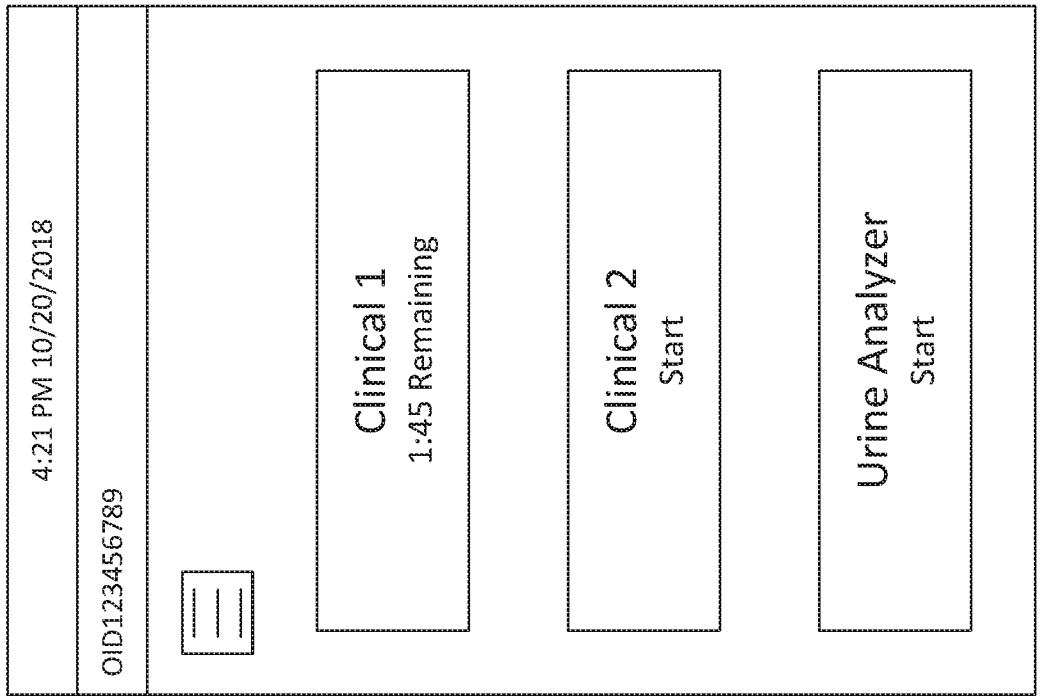
FIG. 5E shows example icons presented by a user interface for representing the plurality of diagnostic engines.

As shown in FIG. 5E, after entering or confirming the patient information, the diagnostic engine may begin running a test on the test sample. The user interface, in response to the user entering or confirming the patient information, may instruct the diagnostic engine corresponding to the selected icon to begin running a test on the sample. The user interface may be configured to display a status of one or more of the diagnostic engines. In one embodiment, the user interface may be configured to display an icon representing a status of each of the plurality of available diagnostic engines. As shown in this figure, the user interface may display a status of a test being performed by Clinical 1 (e.g., one minute and forty-five seconds remaining) and may display that the Clinical 2 Analyzer and the Urine Analyzer are available for use. The user interface may display the status of a given diagnostic engine in any number of ways. For example, the user interface may display a percentage complete, a time remaining, a time elapsed, and/or may display graphically the status of the diagnostic engine (e.g., using a graphical status indicator).

As shown in FIG. 5F, the user may be promoted to log out of the point of care system. In one embodiment, the user may be automatically logged out of the point of care system after the diagnostic engine begins running the test. In another embodiment, the user may need to manually log out, but may be unable to begin another test without re-entering their login credentials. For example, if the user were to select the "Clinical 2" icon, the user interface may prompt the user to entire their login credentials prior to beginning the test. In another embodiment, the user interface may allow the same user to begin a new test without entering their login credentials. As shown in this figure, after selecting to log out from the user interface, the operator may be presented with the message "Are you sure you want to log out?" The user may need to click the OK button or otherwise verify that they want to log out of the system before beginning another test.

Figures 5G, 5H:
FIG. 5G shows example icons presented by a user interface for representing the plurality of diagnostic engines.
FIG. 5H shows an example operator login page of the user interface.

As shown in FIG. 5G, The user interface may once again display a current status of the one or more diagnostic engines. The user interface may enable an operator to select a given one of the diagnostic engines for running a test on a sample. The operator may be the first operator that ran the first test or may be a second operator that is different than the first operator. Upon selection of a given one of the icons corresponding to a diagnostic engine, the user interface may prompt the operator to enter their login credentials. In one embodiment, the user interface may prompt the operator to enter their login credentials each time they select a new test. Thus, even if the operator is the same operator that ran the first test, the user interface may still require that operator to enter their login credentials. In another embodiment, the user interface may allow the first operator to begin a second test without entering their login credentials as long as that operator is still logged in to the system.

As shown in FIG. 5H, the user may be prompted via the user interface to enter Operator Login information. As shown in the figure, the user may be configured to enter login credentials comprising any combination of letters, numbers, symbols, etc. It is understood that the operator identifier may comprise any kind of identifier, including but not limited to a user name, a password, a PIN number, and a barcode that is scannable using a barcode reader associated with the user interface. For example, the user may select the "scan" button in order to enable a barcode scanner of the user interface. In addition, the point of care system may use voice recognition and biometric information such as facial recognition techniques in order to identify a user. The login information may be entered by any number of means, such as through a keyboard presented by the user interface or using speech to text processing.

As shown in FIG. 5I, the user interface may prompt the user to insert a test sample cartridge into a diagnostic engine. For example, as shown in this figure, if the user selected an HbA1c diagnostic engine in a previous step, the user may be prompted to insert an HbA1c cartridge containing a blood sample into an HbA1c diagnostic engine. Upon insertion of the test sample into the diagnostic engine and/or selection of a given one of the diagnostic engines, the user may select the "OK" button or may otherwise communicate to the user interface to proceed to the next screen.

As shown in FIG. 5J, the user interface may display patient information and/or may prompt the user to enter patient information associated with the selected test sample. For example, the user interface may display or may prompt the user to enter an identifier associated with the patient, patient last name, patient first name, patient gender, and patient date of birth. It is understood that the patient information is not limited to this information. For example, the user interface may also display or prompt the user to enter the patient's, height, weight, pre-existing conditions, past test results, etc. In one embodiment, the user interface may be configured to scan a barcode in order to determine the patient information. The user may select the "scan" button in order to enable a barcode scanner of the user interface. The barcode may be located, for example, on the test sample. The user interface may present additional icons such as a "recent patients" icon and a "patient list" icon in order to assist the user in entering the patient information.

As shown in FIG. 5L, the user interface may display a result of test (e.g., a calculated result) associated with a test performed by a given one of the diagnostic engines. In one embodiment, the user interface may prompt the user to enter their login credentials prior to viewing a result. In another embodiment, any user may view a result without entering their login credentials. For example, in response to a user of the interface selecting the icon corresponding to Clinical Analyzer 1, the user interface may display a result associated with a test performed by Clinical Analyzer 1. In response to a user selecting the icon corresponding to Clinical Analyzer 2, the user interface may be configured to display a result associated with a test performed by Clinical Analyzer 2.

The user interface may be configured to display any type of information in response to selection of an icon by a user of the interface. For example, the user interface may display a calculated result that is based on a measured result received from the diagnostic engine. In the example that the selected icon corresponds to an HbA1c Analyzer, the user interface may display a value corresponding to the patient's HbA1c level, such as 5.6% as shown in this figure. In another embodiment, in response to a user selecting an icon corresponding to a cardiac diagnostic engine, the user interface may display one or more calculated results corresponding to measured results received from the cardiac diagnostic engine. For example, the user interface may display values corresponding to a patient's total cholesterol, LDL cholesterol, HDL cholesterol, triglycerides, non-HDL cholesterol, and high-sensitivity C-reactive protein. The user interface may display information other than the information that was received from the diagnostic engine. For example, the user interface may display an operator ID, the patient ID, the date and time of the test, a diagnostic engine identifier, patient first name, patient last name, patient gender, and patient date of birth. It is understood that the user interface may display only a portion of this information and is not limited to the information described here.

The user interface may allow the user to comment on the measured results and/or the calculated results. For example, by clicking on the "comment" button, the user may enter information associated with the test, such as "HbA1c levels are within normal range" or "follow-up with patient in six months." The user interface may further allow the user to print the results by clicking on the "print" icon or may allow the user to send the results to another entity by selecting the "transmit" icon. For example, upon the user selecting the "print" icon, the user interface may display a list of printers or may automatically print to a select one of the available printers. Additionally or alternatively, in response to the user selecting the "transmit" icon, the user interface may allow the user to manually enter a destination such as an email address or other system capable of receiving results, or may allow the user to select the destination from a drop-down menu.

Figure 5N:
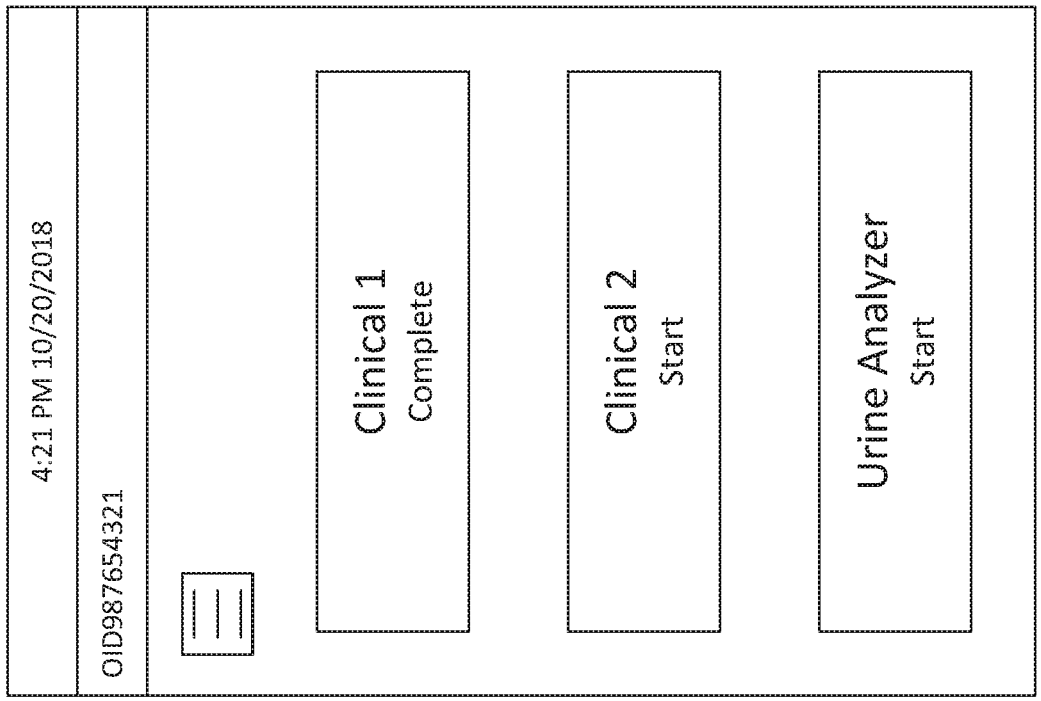
FIG. 5N shows example icons presented by a user interface for representing the plurality of diagnostic engines.
Figure 5M:
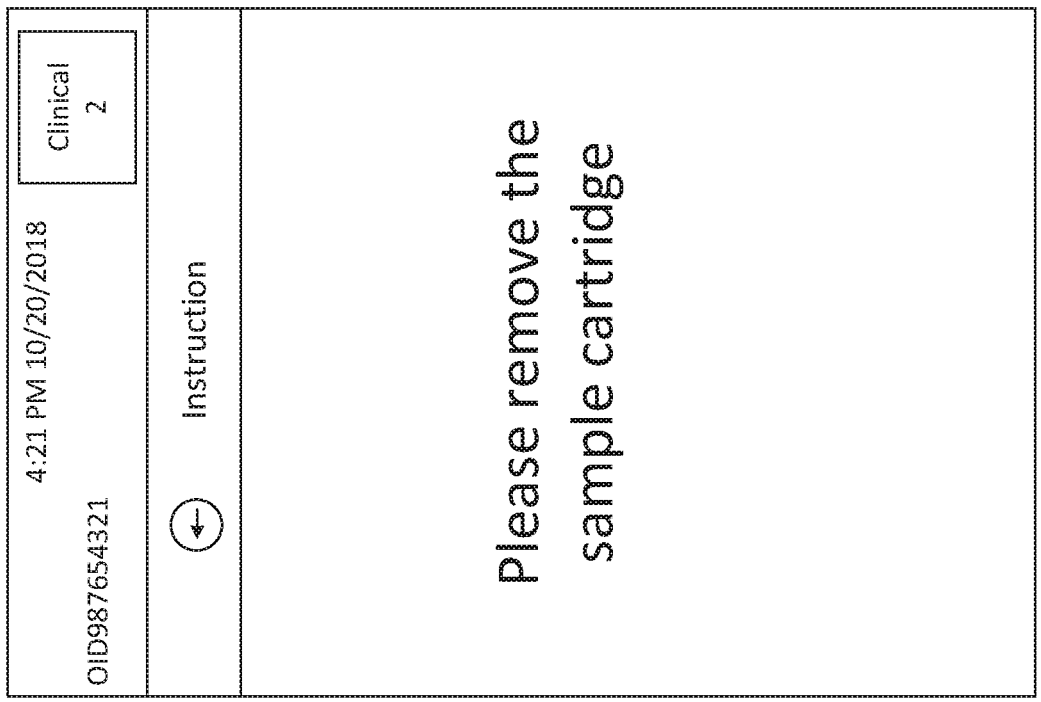
FIG. 5M shows an example prompt displayed by the user interface.
Figure 50:
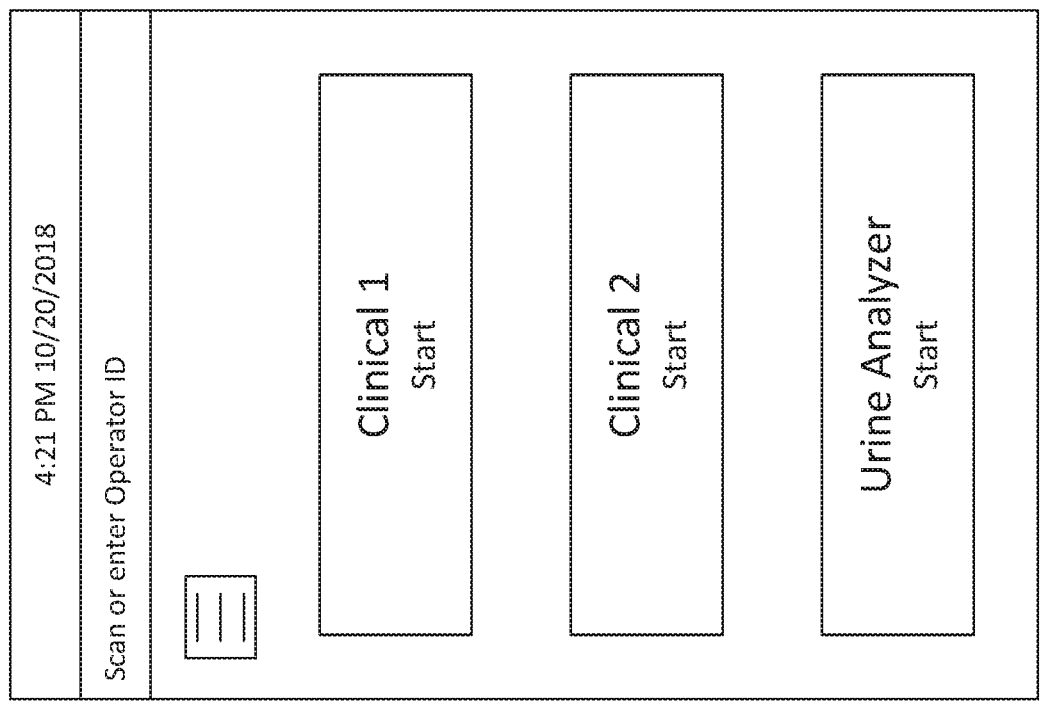

As shown in FIG. 5M, the user interface may instruct the user to remove the test cartridge. The user interface may instruct the user to remove the test cartridge corresponding to the icon for which the user is currently viewing the results. The user interface may present this instruction to remove the test cartridge at any point before, during, or after the user has viewed the results. In one example, the user interface may only display this message in response to a user selecting that they have viewed the results or that the user has printed or transmitted the results. The user interface may be configured to automatically store the results received from the diagnostic engine in a database. This process of storing test results may also be performed before, during or after the user has viewed the results based on the test performed by the diagnostic engine. The user interface may also display additional information, such as how to properly dispose of the test cartridge.

As shown in FIG. 5N, the user interface may display a status of all or some of the diagnostic engines that are connected to the user interface. After the user has viewed a result of a test associated with a given diagnostic engine and has removed the test cartridge from that diagnostic engine, the user interface may display that the diagnostic engine is once again available. For example, the user interface may display an icon corresponding to that diagnostic engine that shows the diagnostic engine as being available for use. As shown in this figure, the user interface may display that the Clinical 1 Analyzer has completed a test, and that the Clinical 2 Analyzer and the Urine Analyzer are available for use. As shown in this figure, the user interface may display the operator identifier on the top portion of the screen in order to indicate the operator that is currently logged in to the system. It is understood that this information may displayed anywhere on the screen or may not be displayed at all.

As shown in FIG. 5O, the user interface may automatically logout the operator currently logged into the system after a period of inactivity. For example, the user interface may automatically logout the current operator after sixty seconds of inactivity. It is understood that the user interface may log the operator out of the user interface after any period of time and that this period of time may be set by an operator of the user interface such as an administrator in a location where the point of care system is located. As shown in this figure, once the user is logged out of the system, the user interface may display the prompt "scan or enter Operator ID." At this point, in response to a user selecting the icon corresponding to "Clinical 1," the user interface may require a user to enter login credentials.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

Example Embodiments

1. A point of care system comprising:
a plurality of diagnostic engines, each diagnostic engine being configured to perform a test on a sample and to generate a measured result based on the test on the sample; and
an instrument data manager (IDM) in electronic communication with each of the plurality of diagnostic engines, the IDM being configured to:
communicate with each of the plurality of diagnostic engines to enable a plurality of tests to be performed on a plurality of samples substantially simultaneously by a plurality of users using the plurality of diagnostic engines;
receive one or more measured results from one or more of the diagnostic engines;
determine one or more calculated results based on the one or more measured results and at least one other parameter; and
present a single user interface for managing testing by the plurality of diagnostic engines and for displaying the one or more calculated results.

2. The point of care system recited in claim 1, wherein the user interface requires entry of a patient identifier associated with a given one of the samples prior to displaying a calculated result associated with the given sample.

3. The point of care system recited in claim 1, wherein the IDM is configured to communicate with each of the plurality of diagnostic engines via wireless communications.

4. The point of care system recited in claim 1, wherein each diagnostic engine is the same type of diagnostic engine.

5. The point of care system recited in claim 1, wherein one or more of the plurality of diagnostic engines are different types of diagnostic engines.

6. The point of care system recited in claim 1, wherein the plurality of diagnostic engines comprise at least one of a blood gas diagnostic engine, a cardiac diagnostic engine, a coagulation diagnostic engine, a diabetes diagnostic engine, and a urinalysis diagnostic engine.

7. The point of care system recited in claim 1, wherein the user interface displays, for each diagnostic engine, an icon representing that diagnostic engine.

8. The point of care system recited in claim 7, wherein the icon for each diagnostic engine indicates a status of the diagnostic engine.

9. The point of care system recited in claim 1, wherein the IDM receives the measured results from one or more of the plurality of diagnostic engines in non-real time.

10. The point of care system recited in claim 1,
wherein the at least one other parameter comprises one or more of demographic information associated a patient and a time of day at which the measured result was determined.

11. An instrument data manager (IDM) for controlling a plurality of diagnostic engines, the IDM being configured to:
communicate with each of the plurality of diagnostic engines to enable a plurality of tests to be performed on a plurality of samples substantially simultaneously by a plurality of users using the plurality of diagnostic engines;
receive one or more measured results from one or more of the diagnostic engines;
determine one or more calculated results based on the one or more measured results and at least one other parameter; and
present a single user interface for managing testing by the plurality of diagnostic engines and for displaying the one or more calculated results.

12. The IDM recited in claim 11, wherein the user interface requires entry of a patient identifier associated with a given one of the samples prior to displaying a calculated result associated with the given sample.

13. The IDM recited in claim 11, wherein the IDM is configured to communicate with each of the plurality of diagnostic engines via wireless communications.

14. The IDM recited in claim 11, wherein each diagnostic engine is the same type of diagnostic engine.

15. The IDM recited in claim 11, wherein one or more of the plurality of diagnostic engines are different types of diagnostic engines.

16. The IDM recited in claim 11, wherein the plurality of diagnostic engines comprise at least one of a blood gas diagnostic engine, a cardiac diagnostic engine, a coagulation diagnostic engine, a diabetes diagnostic engine, and a urinalysis diagnostic engine.

17. The IDM recited in claim 11, wherein the user interface displays, for each diagnostic engine, an icon representing that diagnostic engine.

18. The IDM recited in claim 17, wherein the icon for each diagnostic engine indicates a status of the diagnostic engine.

19. The IDM recited in claim 11, wherein the IDM receives the measured results from one or more of the plurality of diagnostic engines in non-real time.

20. The IDM recited in claim 11,
wherein the at least one other parameter comprises one or more of demographic information associated a patient and a time of day at which the measured result was determined.

What is claimed:

1. A method performed by an instrument data manager (IDM) in electronic communication with a first diagnostic engine and a second diagnostic engine, the first diagnostic engine and the second diagnostic engine each including a processor configured to adjust one or more characteristics of the first diagnostic engine and the second diagnostic engine to keep the first diagnostic engine and the second diagnostic engine within operating conditions to obtain measured results of corresponding tests, and a memory that stores one or more values representing the measured result of the corresponding tests, the first diagnostic engine and the second diagnostic engine having no user interface display, the method comprising:
    receiving, via a single user interface displayed on a display screen and from a first user, a first request to perform a first test on a first fluid sample associated with the first diagnostic engine;
    sending, to the first diagnostic engine and in response to the first request, a first instruction to perform the first test on the first fluid sample associated with the first diagnostic engine;
    receiving, via the single user interface displayed on the display screen and from a second user, a second request to perform a second test on a second sample associated with the second diagnostic engine;
    sending, to the second diagnostic engine and in response to the second request, a second instruction to perform the second test associated with the second diagnostic engine;
    receiving from the first diagnostic engine, one or more first measured result of the first test, wherein the first diagnostic engine, without control from the IDM, carries out the first test to obtain the one or more first measured result of the first test, by:
        mixing the first fluid sample a first time;
        heating, using a heating element, the first fluid sample;
        mixing the first fluid sample a second time, subsequent to heating the first fluid sample; and
        taking, using an optical scanner, an optical reading of the first fluid sample;
    receiving from the second diagnostic engine, one or more second measured result of the second test, wherein the second diagnostic engine, without control from the IDM, carries out the second test to obtain the one or more second measured result; and
    processing one or more of the one or more first measured result and the one or more second measured result to determine a calculated result;
    presenting, on the single user interface for managing testing of the first diagnostic engine and the second diagnostic engine, the calculated result,
    wherein the IDM does not control: the first diagnostic engine to obtain measured results of the first test subsequent to sending the first instruction in response to the first request; or the second diagnostic engine to obtain measured results of the second test subsequent to sending the second instruction in response to the second request; and
    wherein the first test and the second test are performed simultaneously.

2. The method of claim 1, further comprising:
    prompting, via the single user interface, the first user to enter information corresponding to the first fluid sample associated with the first diagnostic engine; and
    prompting, via the single user interface, the second user to enter information corresponding to the second sample associated with the second diagnostic engine,
    wherein the information includes one or more of a patient identifier, a patient demographic, a sample demographic, and order information.

3. The method of claim 2, wherein prompting at least one of the first user to enter information corresponding to the first fluid sample associated with the first diagnostic engine and the second user to enter information corresponding to the second sample associated with the second diagnostic engine is displayed after the corresponding test has been initiated.

4. The method of claim 1, further comprising:
    displaying, via the single user interface and after initiating the first test associated with the first diagnostic engine, a first icon representing the first diagnostic engine; and
    displaying, via the single user interface and after initiating the second test associated with the second diagnostic engine, a second icon representing the second diagnostic engine.

5. The method of claim 1, wherein the second diagnostic engine comprises at least one of a blood gas diagnostic engine, a cardiac diagnostic engine, a coagulation diagnostic engine, a diabetes diagnostic engine, and a urinalysis diagnostic engine.

6. The method of claim 5, wherein the first diagnostic engine and the second diagnostic engine are different types of diagnostic engines.

7. The method of claim 1, wherein the first user is a different user than the second user.

8. The method of claim 1, wherein the IDM receives measured results from the first diagnostic engine in non-real time.

9. The method of claim 8, wherein processing one or more of the one or more first measured result and the one or more second measured result to determine the calculated result includes generating the calculated result based on the measured result and at least one other parameter,
    wherein the at least one other parameter comprises demographic information associated with a patient and a time of day at which the measured result was determined.

10. The method of claim 1, further comprising:
    receiving from the first diagnostic engine a first status of the first test and from the second diagnostic engine a second status of the second test, each of the first status and the second status being one or more of: a percentage complete, a time remaining, and a time elapsed; and
    presenting on the single user interface for managing testing of the first diagnostic engine and the second diagnostic engine, the first status of the first diagnostic engine the second status of the second diagnostic engine.

11. An instrument data manager (IDM) in electronic communication with a first diagnostic engine and a second diagnostic engine, the first diagnostic engine and the second diagnostic engine each including a processor configured to adjust one or more characteristics of the first diagnostic engine and the second diagnostic engine to keep the first diagnostic engine and the second diagnostic engine within operating conditions to obtain measured results of corresponding tests, and a memory that stores one or more values representing the measured result of the corresponding tests, the first diagnostic engine and the second diagnostic engine having no user interface display, wherein the IDM comprises a processor and a memory, the memory storing computer executable instructions which, when executed by the processor, cause the IDM to perform operations comprising:
- receiving, via a single user interface displayed on a display screen and from a first user, a first request to perform a first test on a first fluid sample associated with the first diagnostic engine;
- sending, to the first diagnostic engine and in response to the first request, a first instruction to perform the first test on the first fluid sample associated with the first diagnostic engine;
- receiving, via the single user interface displayed on the display screen and from a second user, a second request to perform a second test on a second sample associated with the second diagnostic engine; and
- sending, to the second diagnostic engine and in response to the second request, a second instruction to perform the second test associated with the second diagnostic engine,
- receiving, from the first diagnostic engine, one or more first measured result of the first test, wherein the first diagnostic engine, without control from the IDM, carries out the first test to obtain the one or more first measured result of the first test by:
  - mixing the first fluid sample a first time;
  - heating, using a heating element, the first fluid sample;
  - mixing the first fluid sample a second time, subsequent to heating the first fluid sample; and
  - taking, using an optical scanner, an optical reading of the first fluid sample;
- receiving from the second diagnostic engine, one or more second measured result of the second test, wherein the second diagnostic engine, without control from the IDM, carries out the second test to obtain the one or more second measured result; and
- processing one or more of the one or more first measured result and the one or more second measured result to determine a calculated result;
- wherein the first test associated with the first diagnostic engine and the second test associated with the second diagnostic engine are performed simultaneously; and
- wherein the IDM does not control: the first diagnostic engine to obtain measured results of the first test subsequent to sending the first instruction in response to the first request; or the second diagnostic engine to obtain measured results of the second test subsequent to sending the second instruction in response to the second request.

12. The IDM of claim 11, wherein the instructions, when executed, further cause the IDM to perform operations comprising:
- prompting, via the single user interface, the first user to enter information corresponding to the first fluid sample associated with the first diagnostic engine; and
- prompting, via the single user interface, the second user to enter information corresponding to the second sample associated with the second diagnostic engine,
- wherein the information includes one or more of a patient identifier, a patient demographic, a sample demographic, and order information.

13. The IDM of claim 12, wherein prompting at least one of the first user to enter information corresponding to the first fluid sample associated with the first diagnostic engine and the second user to enter information corresponding to the second sample associated with the second diagnostic engine is displayed after the corresponding test has been initiated.

14. The IDM of claim 11, wherein the instructions, when executed, further cause the IDM to perform operations comprising:
- displaying, via the single user interface and after initiating the first test associated with the first diagnostic engine, a first icon representing the first diagnostic engine; and
- displaying, via the single user interface and after initiating the second test associated with the second diagnostic engine, a second icon representing the second diagnostic engine.

15. The IDM of claim 11, wherein the second diagnostic engine comprises at least one of a blood gas diagnostic engine, a cardiac diagnostic engine, a coagulation diagnostic engine, a diabetes diagnostic engine, and a urinalysis diagnostic engine.

16. The IDM of claim 15, wherein the first diagnostic engine and the second diagnostic engine are different types of diagnostic engines.

17. The IDM of claim 11, wherein the first user is a different user than the second user.

18. The IDM of claim 11, wherein the IDM receives measured results from the first diagnostic engine in non-real time.

19. The IDM of claim 18, wherein processing one or more of the one or more first measured result and the one or more second measured result to determine the calculated result includes generating the a calculated result based on the measured result and at least one other parameter,
- wherein the at least one other parameter comprises demographic information associated with a patient or a time of day at which the measured result was determined.

20. An instrument data manager (IDM) in electronic communication with a first diagnostic engine and a second diagnostic engine, the first diagnostic engine and the second diagnostic engine each including a processor configured to adjust one or more characteristics of the first diagnostic engine and the second diagnostic engine to keep the first diagnostic engine and the second diagnostic engine within operating conditions to obtain measured results of corresponding tests, and a memory that stores one or more values representing the measured result of the corresponding tests, the first diagnostic engine and the second diagnostic engine having no user interface display, wherein the IDM comprises a processor and a memory, the memory storing computer executable instructions which, when executed by the processor, cause the IDM to perform operations comprising:
- receiving, via a single user interface displayed on a display screen and from a first user, a first request to perform a first test on a first sample associated with the first diagnostic engine;

sending, to the first diagnostic engine and in response to the first request, a first instruction to perform the first test on the first sample associated with the first diagnostic engine, wherein the first diagnostic engine comprises a device responsive to chemical characteristics, the device comprising one or more of a chemical surface, an integrated circuit structure, a micro-electro-mechanical structure, and an optical sensor;

receiving, via the single user interface displayed on the display screen and from a second user, a second request to perform a second test on a second sample associated with the second diagnostic engine; and sending, to the second diagnostic engine and in response to the second request, a second instruction to perform the second test associated with the second diagnostic engine;

receiving, from the first diagnostic engine, one or more first measured result of the first test, wherein, without control from the IDM, the first diagnostic engine carries out the first test to obtain the one or more first measured result of the first test by recognizing an analyte of interest in the first sample by using one or more of membrane entrapment, physical adsorption, matrix entrapment, reaction chamber, and covalent bonding to produce one or more of a charge and an optical change at one or more of a sensor-transducer interface and an electrode;

receiving from the second diagnostic engine, one or more second measured result of the second test, wherein the second diagnostic engine carries out the second test without control from the IDM to obtain the one or more second measured result; and processing one or more of the one or more first measured result and the one or more second measured result to determine a calculated result; and wherein the IDM does not control: the first diagnostic engine to obtain measured results of the first test subsequent to sending the first instruction in response to the first request, or the second diagnostic engine to obtain measured results of the second test subsequent to sending the second instruction in response to the second request.

* * * * *